(12) United States Patent
Jensen et al.

(10) Patent No.: US 8,632,312 B2
(45) Date of Patent: Jan. 21, 2014

(54) REINFORCED BLADE FOR WIND TURBINE

(75) Inventors: Find Mølholt Jensen, Viby Sjœlland (DK); Per Hørlyk Nielsen, Aaby (DK)

(73) Assignee: Bladena APS, Ringsted (DK)

( * ) Notice: Subject to any disclaimer, the term of this patent is extended or adjusted under 35 U.S.C. 154(b) by 916 days.

(21) Appl. No.: 12/449,064

(22) PCT Filed: Jan. 25, 2008

(86) PCT No.: PCT/DK2008/000032
§ 371 (c)(1),
(2), (4) Date: Sep. 14, 2009

(87) PCT Pub. No.: WO2008/089765
PCT Pub. Date: Jul. 31, 2008

(65) Prior Publication Data
US 2010/0092300 A1    Apr. 15, 2010

(30) Foreign Application Priority Data
Jan. 25, 2007    (DK) .................................. 2007 00118

(51) Int. Cl.
*F01D 5/18*    (2006.01)
(52) U.S. Cl.
USPC ...................................... 416/233; 29/889.721
(58) Field of Classification Search
USPC ......... 416/227, 232, 225, 226, 223 R, 227 A; 29/889.2, 889.72, 889.721
See application file for complete search history.

(56) References Cited

U.S. PATENT DOCUMENTS

| 4,295,790 A | 10/1981 | Eggert, Jr. |
|---|---|---|
| 4,305,699 A | 12/1981 | Martinelli |
| 4,494,910 A | 1/1985 | Hahn et al. |
| 4,643,646 A | 2/1987 | Hahn et al. |
| 4,976,587 A | 12/1990 | Johnston et al. |
| 5,375,324 A | 12/1994 | Wallace et al. |
| 5,401,138 A | 3/1995 | Mosiewicz |
| 5,534,354 A | 7/1996 | Gregg et al. |
| 6,457,943 B1 | 10/2002 | Olsen et al. |
| 7,179,059 B2 | 2/2007 | Sorensen et al. |
| 7,198,471 B2 | 4/2007 | Gunneskov et al. |
| 7,901,188 B2 | 3/2011 | Llorente Gonzalez et al. |
| 2003/0116262 A1 | 6/2003 | Stiesdal et al. |
| 2006/0175731 A1 | 8/2006 | Bech et al. |
| 2007/0040294 A1 | 2/2007 | Arelt |
| 2007/0110584 A1 | 5/2007 | Stommel |

(Continued)

FOREIGN PATENT DOCUMENTS

| CA | 1151072 | 7/1981 |
|---|---|---|
| CN | 101029629 A | 9/2007 |

(Continued)

OTHER PUBLICATIONS

PCT International Search Report in DK 2008/00861, dated Feb. 20, 2009 (JENSEN).

(Continued)

*Primary Examiner* — Dwayne J White
(74) *Attorney, Agent, or Firm* — Lee & Morse, P.C.

(57) ABSTRACT

The invention introduces a reinforcement of a box girder of a wind turbine blade. The reinforcement prevents the transverse shear distortion of the blade structure, when the blade is loaded during operation. The reinforcement connects the corners diagonally opposite inside the girder, and fixes them in relation to each other. The reinforcement increases the blade's resistance to overall collapse. The reinforcement comprises one or more individual element, such as rods or plates.

25 Claims, 21 Drawing Sheets

(56) References Cited

U.S. PATENT DOCUMENTS

Figure 1:
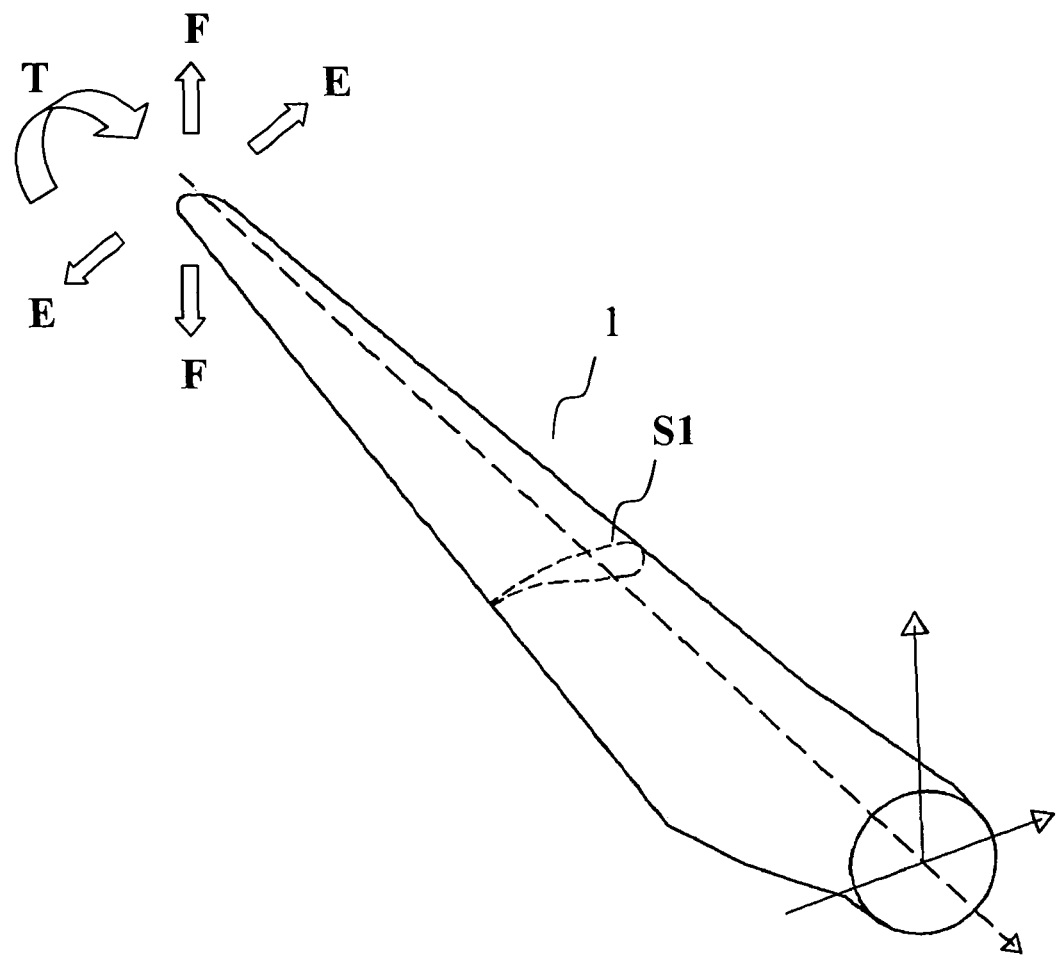

| | | |
|---|---|---|
| 2007/0110585 A1 | 5/2007 | Bonnet |
| 2007/0140861 A1 | 6/2007 | Wobben |
| 2007/0189903 A1 | 8/2007 | Eyb |
| 2007/0217918 A1 | 9/2007 | Baker et al. |
| 2008/0069699 A1 | 3/2008 | Bech |
| 2008/0304971 A1 | 12/2008 | Liebmann |
| 2008/0310964 A1 | 12/2008 | Llorente Gonzalez et al. |
| 2009/0208341 A1 | 8/2009 | Llorente Gonzalez et al. |
| 2009/0324412 A1 | 12/2009 | Roorda |
| 2010/0062238 A1 | 3/2010 | Doyle et al. |
| 2010/0092300 A1 | 4/2010 | Jensen et al. |

FOREIGN PATENT DOCUMENTS

| | | |
|---|---|---|
| DE | 2923463 A1 | 12/1980 |
| DE | 3037677 A1 | 5/1982 |
| DE | 4225599 A1 | 2/1994 |
| DE | 4428730 A1 | 2/1996 |
| DE | 20320714 U1 | 2/2005 |
| EP | 0061567 A2 | 2/1982 |
| EP | 0062737 A1 | 2/1982 |
| EP | 0258926 A1 | 3/1988 |
| EP | 0391702 A1 | 10/1990 |
| EP | 1184566 A1 | 3/2002 |
| EP | 1310351 A1 | 5/2003 |
| EP | 1522724 A1 | 4/2005 |
| EP | 1584817 A1 | 10/2005 |
| EP | 1754589 A1 | 2/2007 |
| EP | 1785621 A2 | 5/2007 |
| EP | 1808598 A1 | 7/2007 |
| EP | 1878915 A2 | 1/2008 |
| EP | 1880833 A1 | 1/2008 |
| FR | 568874 A | 4/1924 |
| FR | 701140 A | 3/1931 |
| FR | 703261 A | 4/1931 |
| FR | 2286953 A1 | 4/1976 |
| FR | 2459381 A1 | 1/1981 |
| FR | 2898865 A1 | 9/2007 |
| GB | 319299 | 9/1929 |
| GB | 909004 | 10/1962 |
| GB | 2042093 A | 9/1980 |
| GB | 2062120 A | 5/1981 |
| GB | 2115075 A | 9/1983 |
| JP | 61-192866 A | 8/1986 |
| JP | 62-282176 A | 12/1987 |
| JP | 2003-214322 A | 7/2003 |
| JP | 2003-293937 A | 10/2003 |
| NL | 9100816 A | 12/1992 |
| WO | WO 00/14405 | 3/2000 |
| WO | WO 01/46582 A2 | 6/2001 |
| WO | WO 01/46582 A3 | 6/2001 |
| WO | WO 01/98653 A1 | 12/2001 |
| WO | WO 03/008800 A1 | 1/2003 |
| WO | WO 03/087572 A1 | 10/2003 |
| WO | WO 2004/078442 A1 | 9/2004 |
| WO | WO 2005/011964 A1 | 2/2005 |
| WO | WO 2006/002621 A1 | 1/2006 |
| WO | WO 2006/066593 A1 | 6/2006 |
| WO | WO 2006/103307 | 10/2006 |
| WO | WO 2008/086805 A1 | 7/2008 |
| WO | WO 2008/089765 A2 | 7/2008 |
| WO | WO 2008/089765 A3 | 7/2008 |

OTHER PUBLICATIONS

PCT International Search Report in DK 2008/00867, dated Feb. 24, 2009 (JENSEN).

PCT International Search Report in 2008/0921, dated Mar. 24, 2009 (JENSEN).

Jensen, et al.; Full Scale Test of a SSP 34m box girder 1.Data Report; Riso National Laboratory for Sustainable Energy; Mar. 2008; pp. 1-77; Riso-R-1622 (EN); Technical University of Denmark; Roskilde, Denmark.

Jensen, et al.; Full Scale Test of a SSP 34m box girder 1.Data Report; Appendix E; Riso National Laboratory for Sustainable Energy; Mar. 2008; pp. 78-150; Riso-R-1622 (EN); Technical University of Denmark; Roskilde, Denmark.

Jensen, et al.; Full Scale Test of a SSP 34m box girder 2. Data Report; Riso National Laboratory for Sustainable Energy; May 2008; pp. 1-159; Riso-R-1588 (EN); Technical University of Denmark; Roskilde, Denmark.

Jensen; Ultimate strength of a large wind turbine blade; Riso National Laboratory for Sustainable Energy; May 2008; pp. 1-313; Riso-PhD-34(EN); ISBN 978-87-550-3634-5, DTU BYG R-205- ISBN=9788778772831; Technical University of Denmark; Roskilde & Kgs. Lyngby, Denmark.

Nielsen; Experimental and numerical analysis of a wind turbine blade cross section under lateral load conditions; pp. 1-44; Dec. 20, 2006.

Jensen, et al.; Structural testing and numerical simulation of a 34 m composite wind turbine blade; Composite Structures; Jul. 2006; pp. 52-61; vol. 76; Elsevier.

Technical Survey Report 162778; PRV InterPat; Dec. 27, 2007; pp. 1-3; Stockholm, Sweden.

Technical Survey Report; 162779; PRV InterPat; Dec. 27, 2007; pp. 1-4; Stockholm, Sweden.

Technical Survey Report; 162780; PRV InterPat; Dec. 27, 2007; pp. 1-4 Stockholm, Sweden.

Chinese Office action dated Jan. 7, 2013 for related application CN 200980124196.2.

REINFORCED BLADE FOR WIND TURBINE

CROSS REFERENCE TO RELATED APPLICATIONS

This is the U.S. national phase application based on PCT Application No. PCT/DK2008/000032 filed Jan. 25, 2008, which is based on Danish Application PA 2007 00118, filed Jan. 25, 2007, the entire contents of all of which is hereby incorporated by reference.

The present invention relates to a reinforced blade for a wind turbine, particularly to a blade having reinforcing members for reinforcing one or more structural members in the blade in order to prevent transverse shear distortion of the blade when it is loaded in operation.

Typically, a wind turbine blade has an aerodynamic shell and a girder, such as a beam or a spar. The girder can be a single beam, but often two girders are used. The two girders together with the parts of the shell extending between the two girders form a so-called box profile. The top and bottom of the box profile are often referred to as the caps. Some types of blades are designed with a spar in the form of a box profile which is manufactured separately and bonded in between prefabricated surface shells. The aerodynamic shell is typically made of a laminate of fibre reinforced plastics, fibreglass and/or other materials. Typically, the aerodynamic shell is made from two shell parts that are assembled to form the shell.

Under normal operation conditions, the wind turbine blade is subjected to loads at an angle to the flapwise direction. It is common to resolve this load on the blade into its components in the flapwise and edgewise direction. The flapwise direction is a direction substantially perpendicular to a transverse axis through a cross-section of the blade. The flapwise direction may thus be construed as the direction, or the opposite/reverse direction, in which the aerodynamic lift acts on the blade. The edgewise loads occur in a direction perpendicular to the flapwise direction. The blade is further subject to torsional loads which are mainly aerodynamic and inertia loads. These loads can subject the blade to harmonic motions or oscillations at the blade's torsional eigenfrequency; cf. FIG. 1 for an indication of the loads and the directions.

During operation of the blade, transverse shear forces are generated in the blade by the flapwise and edgewise loads. The transverse shear forces are indicated on a typical cross-section of the blade shown in FIG. 2a. The transverse shear forces are induced by the flapwise and edgewise loads because of the typical asymmetric geometry and material distribution of the blade. Further, the fact that the flapwise and edgewise loads do not act through the shear centre of the blade contributes to the generation of transverse shear forces.

In a box profile, the transverse shear forces result in high in-plane bending moments in the corners of the box profile. The bending moments may be counteracted by increasing the thickness of the box profile material in the corners, but increased thickness adversely affects the weight of the blade without a justifying contribution to the strength.

In wind turbine blades where the girders are manufactured separately and bonded to the shell parts, restraints in the manufacturing process result in small material thicknesses in the section of the girder that is connected to the shell part and therefore this part of the blade has a low bending stiffness.

The low bending stiffness of the corners of the box profile combined with the high bending moments in the same area, means that the box profile is easily distorted by transverse shear forces, despite the fact that the side, top and bottom of the box profile may be relatively thick.

Figure 2A:
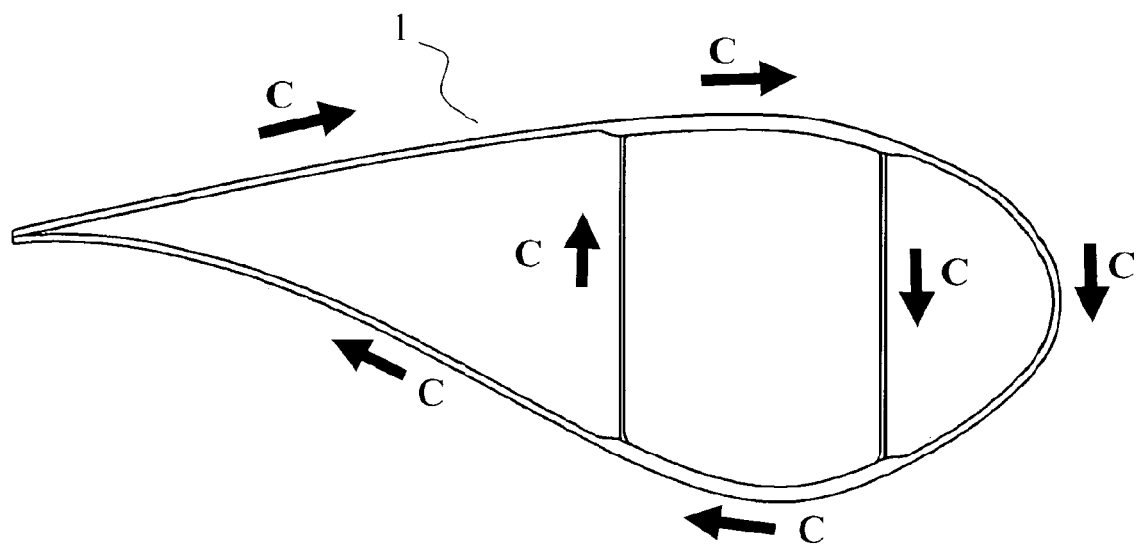
Figure 2B:
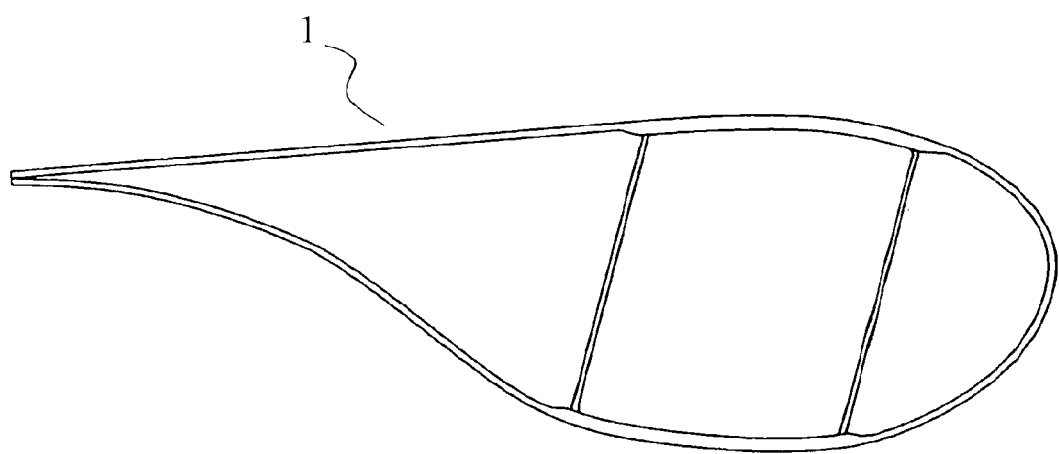
Figure 3:
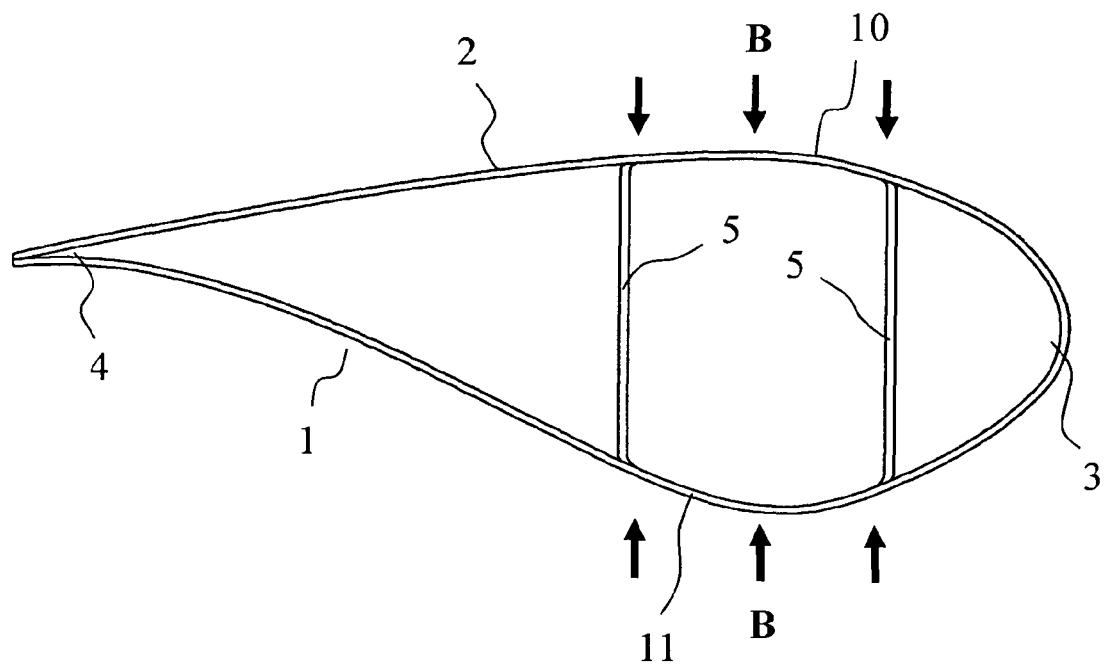

An example of the result of the transverse shear distortion caused by the transverse shear forces is shown in FIG. 2b. The distortion consequently changes the shape of the blade and this has an adverse effect on the blade's ultimate strength. If the transverse shear distortion exceeds a certain limit which depends on the geometry and the material distribution of the blade, the blade's resistance to crushing pressure is reduced and a sudden collapse of the blade can occur. The crushing pressure is caused by the flapwise loads and occurs in the box profile of the blade due to its longitudinal curvature. This effect is also often referred to as ovalization, c.f. FIG. 3. For a further explanation of the effects of crushing pressure, reference is made to the article "Structural testing and numerical simulation of a 34 m composite wind turbine blade" by F. M. Jensen et. al. published by Elsevier in Composite Structures 76 (2006) 52-61.

Furthermore, a deformation of the girder at the connection between the girder and the shell can lead to fatigue failure of the girder or fatigue failure in the connection between the girder and the shell or both.

Thus, there is a need for a wind turbine blade in which the structural layout of the blade profile is designed against transverse shear distortion and wherein the blade structure is generally strengthened without increasing the overall weight. It is further desirable to provide a wind turbine blade with an increased torsional stiffness.

It is therefore an object of the invention to provide a wind turbine blade that is designed against transverse shear distortion by transverse shear forces caused by flapwise and edgewise loads on the blade.

It is also an object of the present invention to provide a reinforced blade profile for a wind turbine blade.

It is a further object to provide a wind turbine blade with an increased torsional stiffness which will decrease the dynamic inertia loads of the blade on the other structural parts of the wind turbine, such as the gearbox and the tower.

It is therefore an object of the present invention to provide a wind turbine blade with improved resistance against deformations of the blade profile.

It is yet another object of the present invention to provide a wind turbine blade with increased overall strength and stiffness.

It is yet another object of the present invention to provide a wind turbine blade with increased resistance to fatigue failure.

It is yet another object of the present invention to provide a wind turbine blade, which can be produced at a reduced manufacturing cost compared to the existing solutions.

It is still another object of the invention to provide wind turbine blade capable of working under severe aerodynamic loads and to optimize the aerodynamic stability, e.g. aeroelastic stability of the blade.

It is further an object of the present invention to provide alternatives to the prior art.

According to a first aspect of the invention, the above-mentioned and other objects are fulfilled by a wind turbine blade comprising a shell, a first girder, and a reinforcing member for inhibiting transverse shear distortion of the blade, wherein the reinforcing member is a straight or linear reinforcing member with a first end and a second opposite end, and wherein the first end is connected to the first girder at a connection between the first girder and the shell at the upper part or the lower part of the shell and the second end is connected to the opposite part of the shell at a distance from the girder.

According to a second aspect of the invention, the above-mentioned and other objects are fulfilled by a wind turbine blade comprising a shell, a first girder, and a reinforcing member for inhibiting transverse shear distortion of the blade, wherein the reinforcing member is a reinforcing angle bar with a first leg abutting the first girder, and a second leg abutting the upper part or the lower part of the shell.

According to a third aspect of the invention, the abovementioned and other objects are fulfilled by a method of inhibiting transverse shear distortion in a wind turbine blade with a shell and a first girder, the method comprising the steps of providing a straight or linear reinforcing member with a first end and a second opposite end, and connecting the first end to the first girder at a connection between the first girder and the shell at the upper part or the lower part of the shell, and connecting the second end to the opposite part of the shell at a distance from the girder.

According to a fourth aspect of the invention, the abovementioned and other objects are fulfilled by a method of inhibiting transverse shear distortion in a wind turbine blade with a shell and a first girder wherein the first girder is connected to an upper part of the shell and a lower part of the shell, the method comprising the steps of providing a reinforcing angle bar having a first leg and a second leg; and connecting the first leg to the first girder, and connecting the second leg to the upper part or the lower part of the shell.

A wind turbine blade having a reinforcing member according to the present invention reduces the transverse shear distortion of the profile and thus increases the blade's resistance to the crushing pressure and thereby increases the ultimate strength of the wind turbine blade. Furthermore, the aerodynamic efficiency of the blade is also improved since the designed shape of the blade profile is maintained to a higher degree than for a conventional blade.

A reinforcing angle bar according to the invention reduces or eliminates the unwanted transverse shear distortion of the blade caused by transverse shear forces since the reinforcing angle bar maintains interconnected surfaces in fixed positions with relation to each other. This improves the overall strength of the blade and may also facilitate the design of a blade with lower total weight.

A straight reinforcing member keeps its end connections in substantially mutually fixed positions and thus prevents the distance between the connections from increasing thereby inhibiting transverse shear distortion and thus, strengthening the shell against transverse shear forces.

Each of the one or more reinforcing members increases the torsional stiffness of the blade. An increase of the torsional stiffness of the blade will also increase the torsional eigenfrequency of the blade and in return decrease the dynamic inertia loads of the blade on other parts of the wind turbine. Furthermore, the increase in the torsional stiffness improves the aeroelastic stability of the blade significantly.

The shell of the blade may preferably, but not exclusively, comprise a composite or laminated material. The material may comprise, alone or in any combination, fibreglass, carbon fibres, or other durable and flexible materials typically with a high strength/weight ratio, such as other fibre reinforced plastic materials that may further comprise, at least in part, light-weight metals or alloys. The shell may typically be a laminate or sandwich-construction. The thickness of the shell may vary along its length and width.

The upper part of the shell has a flat surface and during normal operation of the blade, the upper part of the shell is the suction side of the blade. The lower part of the shell has a more curved surface and during normal operation of the blade, the lower part of the shell is the pressure side of the blade. Thus, the upper part of the shell is also denoted the suction side of the shell, and the lower part of the shell is also denoted the pressure side of the shell.

At least one girder is provided to primarily strengthen the blade along the longitudinal extension of the blade. A girder may also be referred to as a web. Throughout the present disclosure, the girder or web should be construed as any kind of elongate constructional member capable of taking up loads, such as a beam or a spar, e.g. shaped as an I-profile, preferably made from fibre reinforced plastics or other suitable material. The girder may extend along substantially the entire length of the blade.

The blade may have two or more separated girders positioned end to end along the longitudinal extension of the blade, especially for facilitating handling or transporting purposes. In principle, any number of girders may be used, however for the sake of simplicity and for keeping the overall weight of the blade as low as possible, one or two girders are preferred.

The reinforcing member may be a reinforcing angle bar further comprising a plate connected to the first and second legs and protruding therefrom for further reinforcement of the blade. The plate may for example extend centrally with relation to the first and the second leg, or the plate may for example extend at a side edge of the first and the second leg.

An angle bar may also be denoted an angle bracket or an angle plate. Throughout the present disclosure the meaning of the term angle bar includes the meaning of the terms angle bracket and angle plate.

In a wind turbine blade with an angle bar, the angle bar is positioned at the connection between the girder and the shell. The angle bar reduces the change of the angle between the girder and the shell caused by transverse shear distortion of the blade. When the change of angle between the girder and the shell is reduced, the transverse distortion is also reduced.

An angle bar according to the invention may extend along the longitudinal extension of the blade and have substantially the same length as the blade. Preferably, the angle bar is short, and preferably a plurality of angle bars is positioned spaced apart along the longitudinal extension of the blade.

The angle bar may be produced from any suitable material, preferably the angle bar is made of the same material as the shell or the girder, preferably fibre reinforced plastic. The first leg of the angle bar abutting the girder preferably constitutes a plate or flange with a surface contour that matches the contours of the girder at the position of their interconnection. Likewise, the second leg of the angle bar abutting the shell preferably constitutes a plate or flange with a surface contour that matches the contours of the shell at the position of their interconnection. The angle bar may further have a plate connected to the first and second legs and protruding therefrom, preferably substantially perpendicular to the first and second legs, for further reinforcement of the blade. Preferably, the angle bar with the plate is manufactured in one piece.

The reinforcing member may be subjected to tensile and compressive forces when the blade is loaded. To prevent the reinforcing member from buckling when subjected to compression forces, the member can be stiffened with flanges on top of the member or stringers on the side. Further, the member may constitute a sandwich construction with a foam material with laminates on each side.

As further explained below, in an embodiment of the wind turbine blade according to the present invention, the blade is designed so that shear distortion occurs in one direction only so that a reinforcing angle bar can be positioned on the side of the girder where the angel between the girder and the shell increases so that the angle bar will be subjected to tension only whereby the risk of buckling in the angle bar is eliminated or significantly reduced.

The reinforcing angle bar may further comprise a body plate interconnecting its first and second legs whereby the first and second legs are interconnected with the girder and the shell, respectively, at some distance from the connection between the girder and the shell. Preferably, the plate extends in the longitudinal direction of the blade similarly to the legs. In its operating position in the blade, the plate may be supported by foam located in the volume defined between the girder, the shell, and the body plate to prevent buckling failure when loaded in compression. The body plate may constitute a sandwich construction or may have corrugations or stiffeners to prevent buckling failure.

The reinforcing angle bar may further comprise a third leg connected to the first leg opposite the second leg and configured for abutting the one of the upper part and lower part of the shell opposite the second leg.

In a wind turbine blade with a first and second girder, the reinforcing angle bar may be positioned between the first and the second girder.

In a wind turbine blade with a first and second girder, the reinforcing angle bar may be positioned outside the volume defined between the first and the second girder.

In a wind turbine blade with one or more straight reinforcing members according to the invention, a first end of the reinforcing member is connected to the girder in a position identical with, or near or adjacent to where the girder itself is connected to one of the two shell parts. Thus, the reinforcing member is connected to the first girder at a connection between the first girder and the shell at one of the upper part and lower part of the shell. Further, a second, opposite end of each of the straight reinforcing members may be connected to an inner surface of the other shell part. The connection on the inner surface of the shell may in principle be positioned anywhere provided that the reinforcing member exerts a reasonable and useful reinforcing effect in the blade at the selected position.

Preferably, but not exclusively, the straight reinforcing member may be connected at an angle of 15°-75° in relation to the girder.

In a wind turbine blade with two or more girders, each of the one or more straight reinforcing members may be positioned in such a way that it connects not only an inner surface on one of the upper and lower shell parts with one girder, but also interconnects two girders. Preferably, each of the one or more reinforcing members is positioned so that it interconnects two girders and respective inner surfaces of both of the shell parts.

In an embodiment with two or more girders, each of the one or more reinforcing members may connect two girders, but may not be connected to respective inner surfaces of the upper and lower shell parts. Thereby, the assembly of the reinforced wind turbine blade may be made particularly simple or may comprise separate manufacturing or assembling steps.

The connections between reinforcing members and respective girders may comprise any suitable kind of joint such as welded, adhered, melted, bonded, fused or simple mechanical connections.

In an embodiment wherein the one or more reinforcing members are connected to an inner surface of the shell parts, such connections are preferably bonded connections.

The straight reinforcing member has a substantially straight shape, such as the shape of a rod or a stretched wire or a planar member. If the shape of the reinforcing member is not straight, the shape of the reinforcing member could be straightened when subjected to tension leading to movement of its end connections and obviously, this is not desired.

The connections on the inner surface of the profile may in principle be positioned anywhere on the inner surface but it should be observed that the chosen positioning causes the reinforcing member to be able to provide a reasonable and useful reinforcing effect in the profile. The connection of a reinforcing member to connecting points on the inner surface of the profile prevents the negative effects of buckling and ovalization as described above. The connections may comprise any suitable kind of joint such as welded, glued, melted, fused or other simple mechanical connections. The reinforcing member itself may comprise the connections or it may comprise additional connections or connection parts adapted to engage or cooperate with the connections on the inner surface of the profile. The additional connections or connection parts must be sufficiently rigid to maintain their shape when subjected to tension in order to properly cooperate with the reinforcing member to prevent the connections on the shells from being displaced away from each other. In embodiments, the reinforcing member is connected to an inner surface of the shell of the profile. Preferably, the inner surface of the shell is shaped in a manner corresponding to the outer surface thereof, i.e. having a substantially transverse curvature. The reinforcing member may therefore preferably be so positioned on the inner surface of the shell that there will be a certain space (or distance) between the reinforcing member and the inner surface of the profile.

The reinforcing member secures and keeps the transverse curvature of the profile substantially unchanged when the aerodynamic profile is loaded by forces in the flapwise direction. With the reinforcing member according to the invention, the dimensions of the shell may be reduced compared to the prior art leading to reduced loading of other parts of the wind turbine, improved handling and transportation characteristics of the blade and reduced cost.

In an embodiment of the invention with a box profile, each of the one or more straight reinforcing members connects two diagonally opposite corners or corner regions of the box profile. A corner region is a region proximate and including the connection of the respective girder to the respective shell surface. In other words, the unwanted distortion of the blade caused by transverse shear forces may be reduced or prevented by maintaining corners, or regions near the corners, of the box profile in fixed positions with relation to each other. This improves the overall strength of the blade and may also facilitate the design of a blade with lower overall weight.

In an embodiment of the present invention, two or more straight reinforcing members are positioned end to end or in spaced relationship along a longitudinal axis of the blade in such a way that neighbouring reinforcing members alternates between diagonally opposite corners, or corner regions, in the box profile along at least a part of the longitudinal extension of the blade. Thus, a first reinforcing member extends between two diagonally opposed corners of the box profile and a second neighbouring reinforcing member extends between the opposite two diagonally opposed corners of the box profile. A third reinforcing member adjacent the second reinforcing member extends between two opposed corners along substantially the same direction as the extension of the first reinforcing member. Throughout the present disclosure, two diagonally opposite corners connected by a reinforcing member is referred to as a set of corners.

A reinforcing member may comprise one or more elements selected from the group consisting of rods, plates, wires, ropes, tubes, textiles and fabrics. The reinforcing members may be made of any suitable material. Fibre reinforced plastic is presently preferred for rods, plates and tubes. If a rod, plate or tube type element is provided, such element may be subdivided into two or more smaller reinforcing elements over the span between the set of corners. Such smaller elements may be connected to each other or they may be connected to one or more other reinforcing members spanning the other two opposed corners of the box profile. The reinforcing members may be connected to the girders, to the inner surfaces of the shell parts, and to each other by bonding means or mechanical means.

The reinforcing member may comprise a plate possibly with one or more cut-outs, e.g. a laminated plate, such as a sandwich construction, preferably, but not exclusively, comprising a layer of a lightweight foamed material provided between two layers of a fibre reinforced plastic material.

In an embodiment of the invention, two or more straight reinforcing members are provided and arranged at a distance from the outer extremities of each other not exceeding 2×D, wherein D is the spanning distance of one of the reinforcing members, i.e. the distance between two opposing connections of the straight reinforcing member, e.g. between a set of corners in a box profile. The value of parameter D may be identical for two or more neighbouring straight reinforcing members. However, since the width of the cross-section of the wind turbine blade typically decreases towards the tip of the blade, the distance D2 of a reinforcing member located closer to the tip will be smaller than the distance D1 of a reinforcing member located closer to the hub of the wind turbine. The resulting maximum distance between two neighbouring reinforcing members may preferably be calculated based on the minimum of the two distances, i.e. distance D2, or based on the mean value of D1 and D2. It has been found that values of the resulting distance D fulfilling this relationship, there is a good balance between the reinforcing members' ability to take up the shear forces, the total weight of the wind turbine blade and the blade's stiffness. However, the maximum distance between two reinforcing members may in stead be based on other requirements, such as, but not limited to, a need for a particularly strong wind turbine blade design, e.g. when the wind turbine is intended to be subjected to repeatedly severe weather conditions, such as when erected at open sea.

In an embodiment of the invention, two or more reinforcing members may be positioned in certain sections of the blade only, possibly without any predetermined or calculated maximum distance.

In a blade with two or more reinforcing members, the members may be of the same type or may have different geometries, and possibly may be made from different materials. The members may be positioned so that they span the same two opposed corners, e.g. along the longitudinal extension of the blade, or they may alternate between the sets of opposed corners.

In an embodiment of the invention, the reinforcing members are located in positions wherein a substantial transverse distortion of the blade is expected or established.

In an embodiment of the invention, two reinforcing members may constitute the legs of an X-shaped reinforcing member, e.g. produced as an integral member, and interconnecting the upper part of the shell with the lower part of the shell at the respective connection points of the girders to the upper and lower parts of the shell.

The X-shaped reinforcing member may be made from two straight reinforcing members that are assembled to form the X-shaped reinforcing member. The X-shaped reinforcing member may preferably be assembled from plates of a fibre reinforced plastic material laminated to each other. Feet may be provided at the ends of the individual straight reinforcing members forming the legs of the X-shaped member, the feet facilitating connection, particularly by bonding means, to the respective surfaces of the shell or girder or both of the blade. However, the connections may be obtained in other ways, such as by secondary lamination, mechanical connection means, etc, or any combination of such connection measures.

Further, the X-shaped member may be made in one piece. The ends of the legs of the single pieced X-shaped member may preferably be connected with the girders by bonding. Bonding may be performed prior to connection of the girders to the inner surfaces of the blade shell. However, the reinforcing member and the girders may also be provided as a single integrated member, preferably of a fibre reinforced plastic, that is connected to the shell parts.

In an embodiment of the invention with two or more X-shaped reinforcing members, the members may be positioned in certain sections of the blade only and not at any predetermined or calculated distance. Particularly, but not exclusively, the X-shaped members may be located at positions wherein a substantial transverse distortion of the blade is expected or established.

During operation of the blade, only one of the legs of the X-shaped member may be subjected to a load, and this leg will be subjected to tension only whereby the material of the reinforcing member is utilized to a high degree, thus reducing the required material thickness of the member and consequently keeping the total weight of the blade at a minimum.

Assembly of a wind turbine blade with X-shaped members may be facilitated by assembly of the X-shaped members and the girders before assembly with the shell parts, or by manufacturing the X-shaped members and the girders in one piece, thus facilitating at least a better quality control of the parts during assembly.

A wind turbine blade with X-shaped members, a cavity may be provided between a member and a respective girder or the inner surface of a shell part. In order to facilitate the assembly of the reinforcing member with the girders or with the shell parts or with both, the cavity may be filled with a lightweight foamed material to facilitate positioning of the X-shaped member.

In an embodiment of the wind turbine blade according to the present invention, the blade is designed so that shear distortion occurs in one direction only so that a straight reinforcing member can be positioned so that it will be subjected to tension only.

The direction of shear distortion may be controlled by proper orientation of the layers of fibre reinforced plastic of the shell substantially in a single specific direction, or by proper positioning of the one or more girders in the blade, or by positioning the one or more girders at a specific angle in relation to the flapwise direction, or any combination of such measures.

A straight reinforcing member that is positioned so that it will be subjected to tension only keeps its end connections in substantially mutually fixed positions and thus prevents the distance between the connections from increasing thereby strengthening the shell against forces in the flapwise direction. Since the reinforcing member is required to have a high tensional strength only, i.e. the reinforcing member need not carry other loads; the reinforcing member is preferably thin so that its weight and cost are kept at a minimum.

Even though a straight reinforcing member may be subjected to tension only, the member may as well be capable of withstanding compression forces, e.g. the member may comprise a tube or a plate of a laminated or sandwiched construction that is capable of withstanding compression forces.

In an embodiment of the invention, the one or more reinforcing members may be individually designed so that the bending and torsion of the blade is coupled to withstand the high loads of strong wind gusts. This leads to lower fatigue loads on the blade and also facilitate a higher energy output of the wind turbine. The individual design may include pre-tensioning of some of the reinforcing members.

Each of the reinforcing members may comprise one or more electro-mechanical transducers, such as piezoelectric transducers, that may change the extension of respective reinforcing members in certain directions in response to an individual control signal, such as a voltage, a current, an electric field, or a magnetic field, e.g. for imposing stresses on the members coupling the bending and torsion of the blade.

Figure 4:
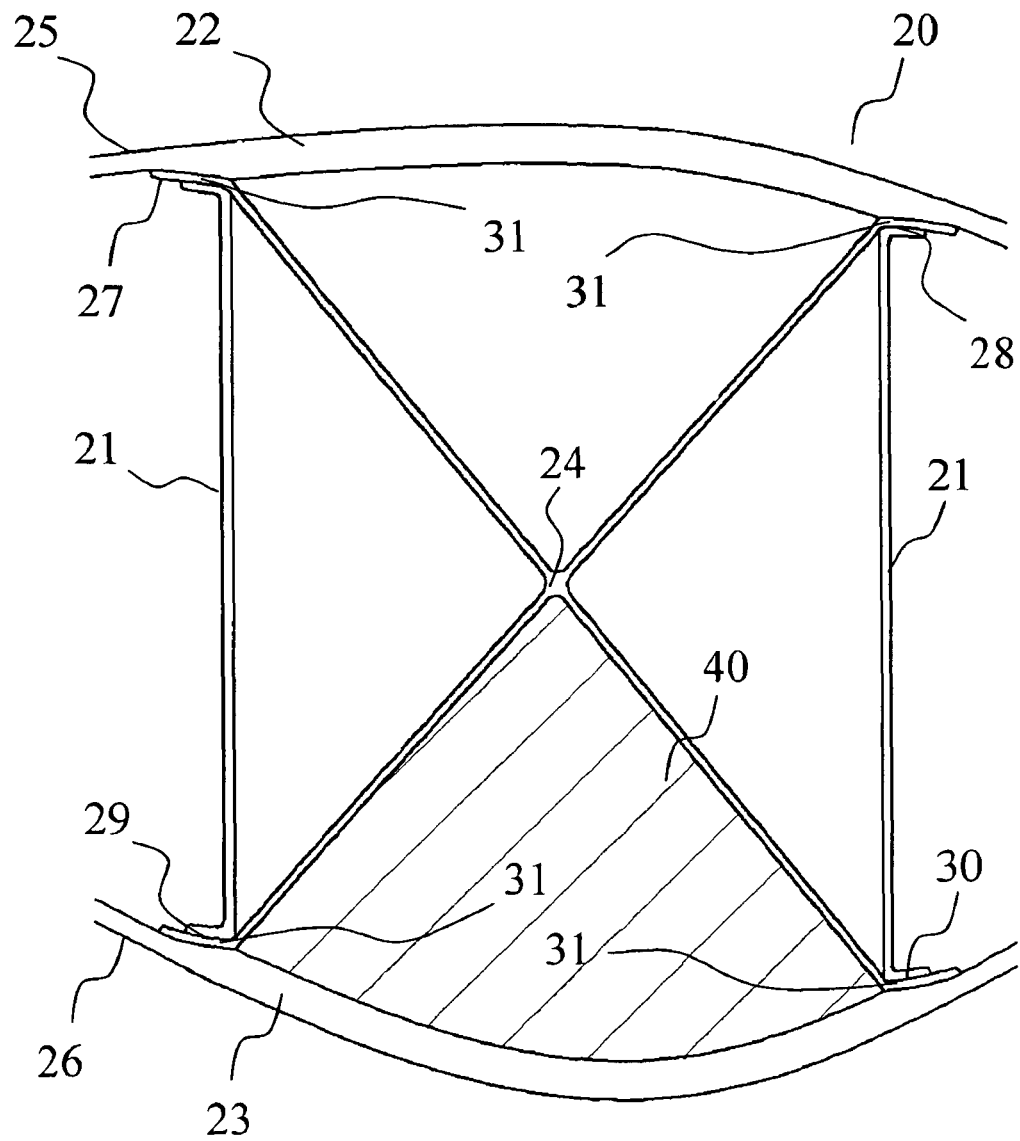
Figure 5:
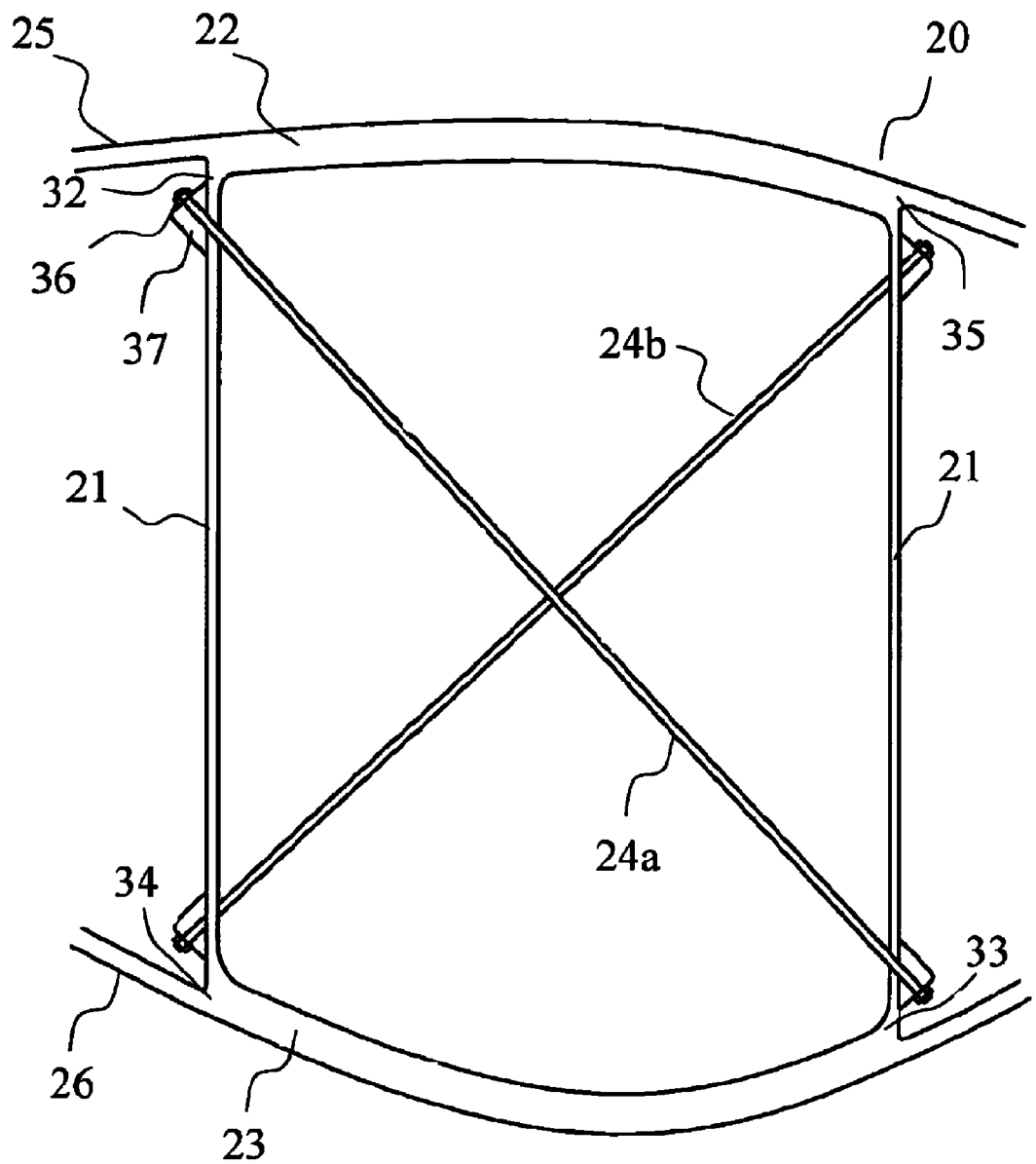
Figure 6:
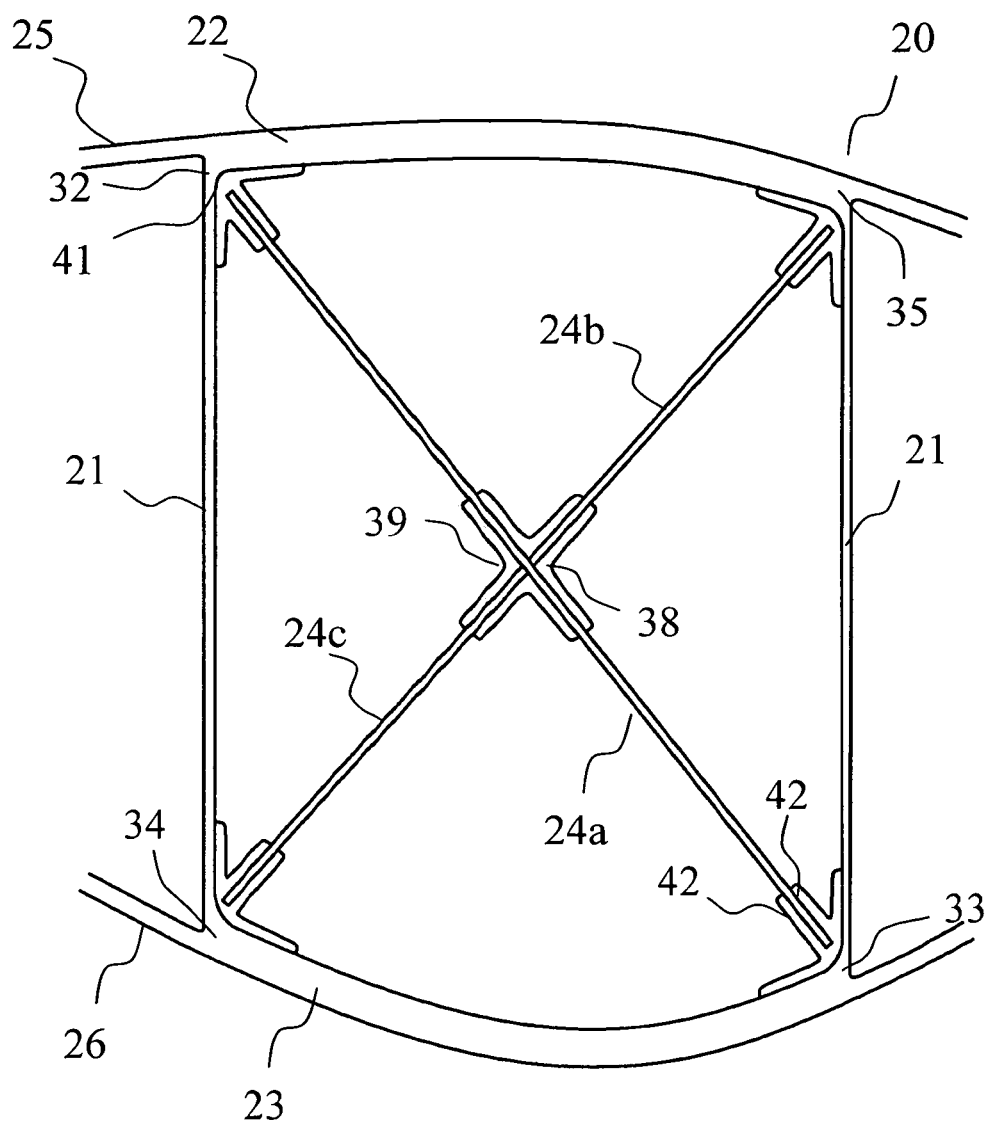
Figure 7:
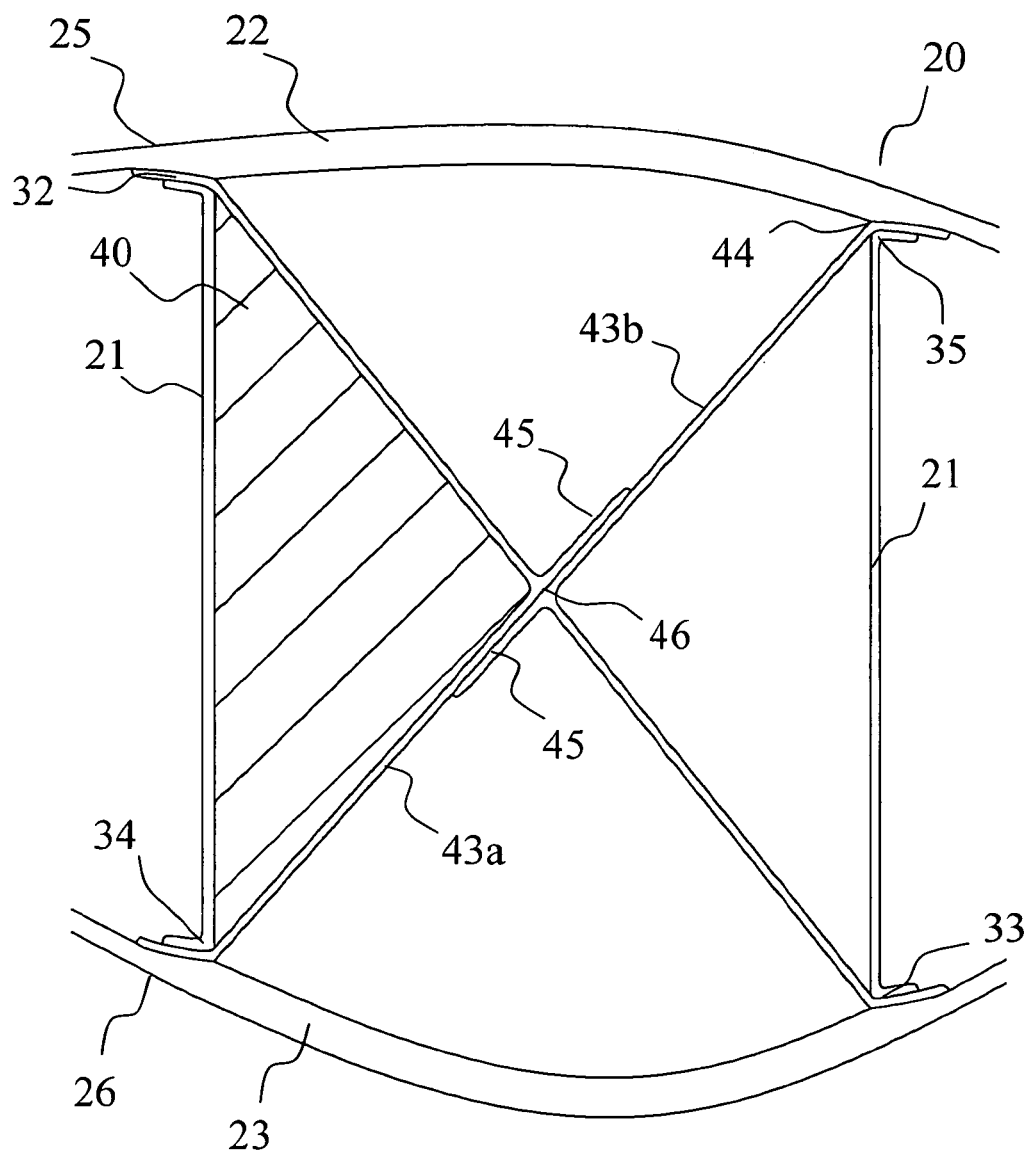
Figure 8:
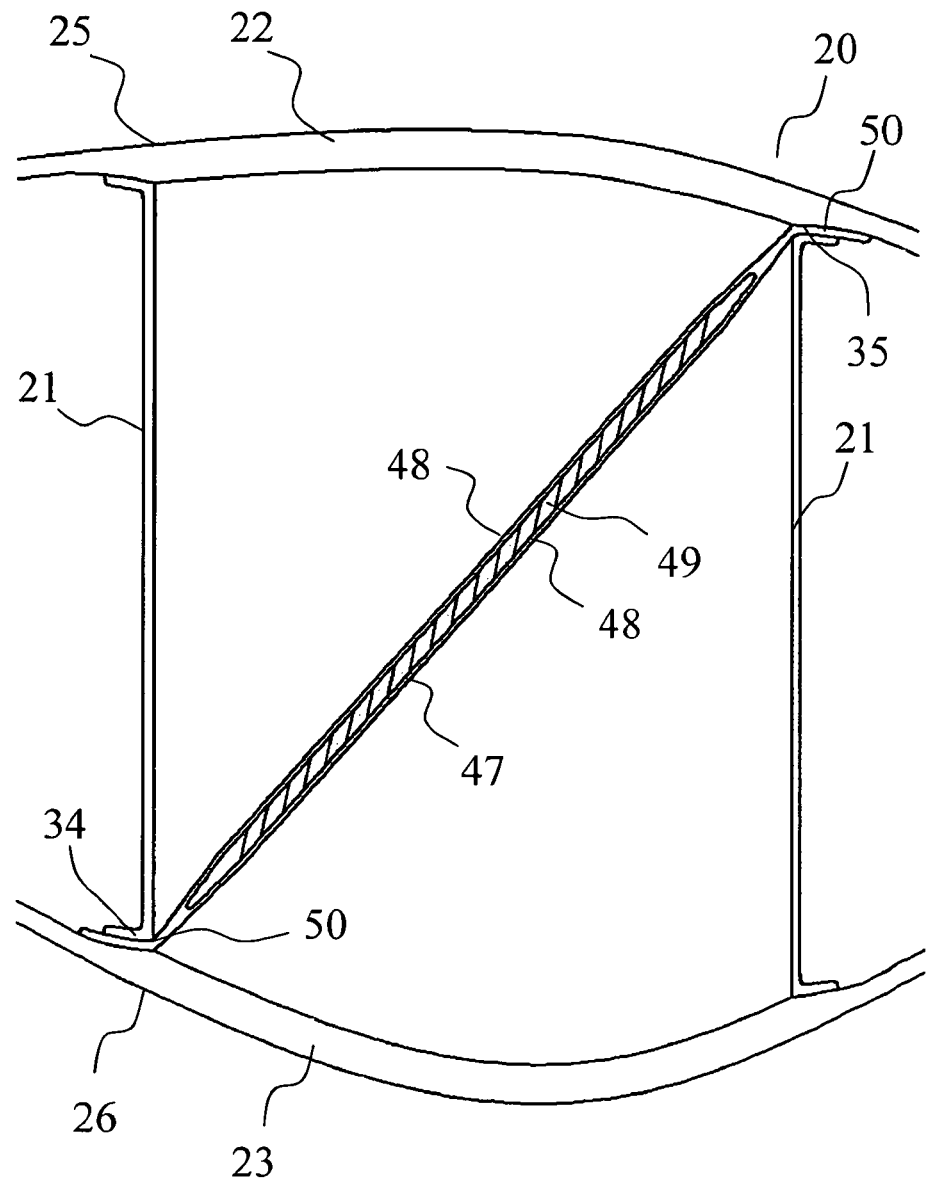
Figure 9:
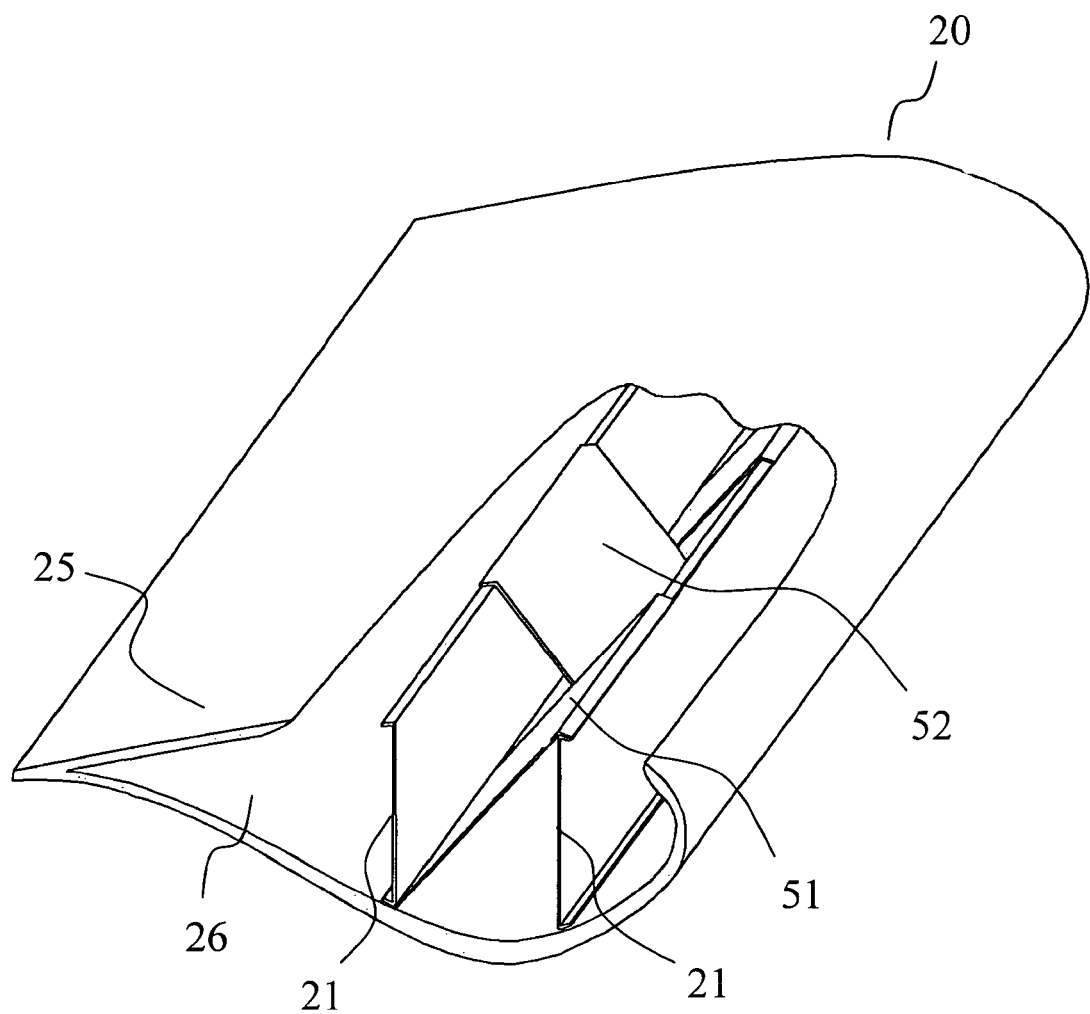
Figure 10:
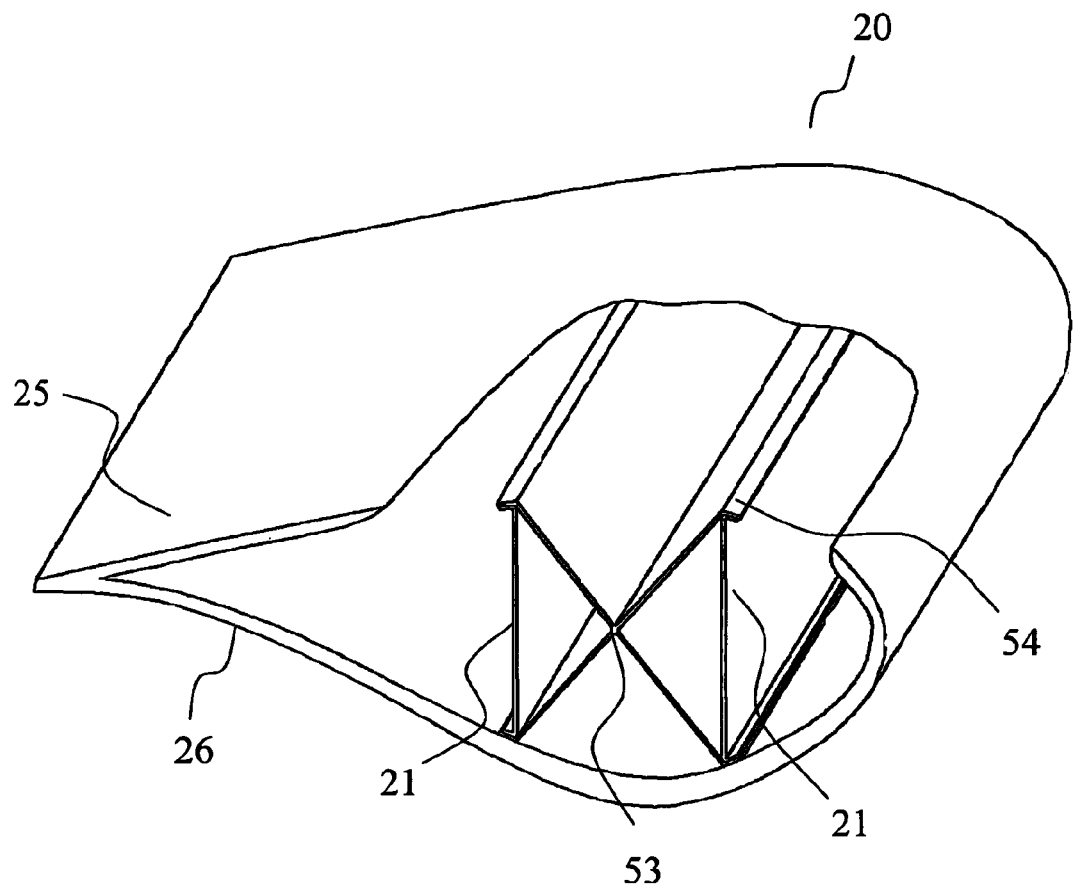
Figure 11:
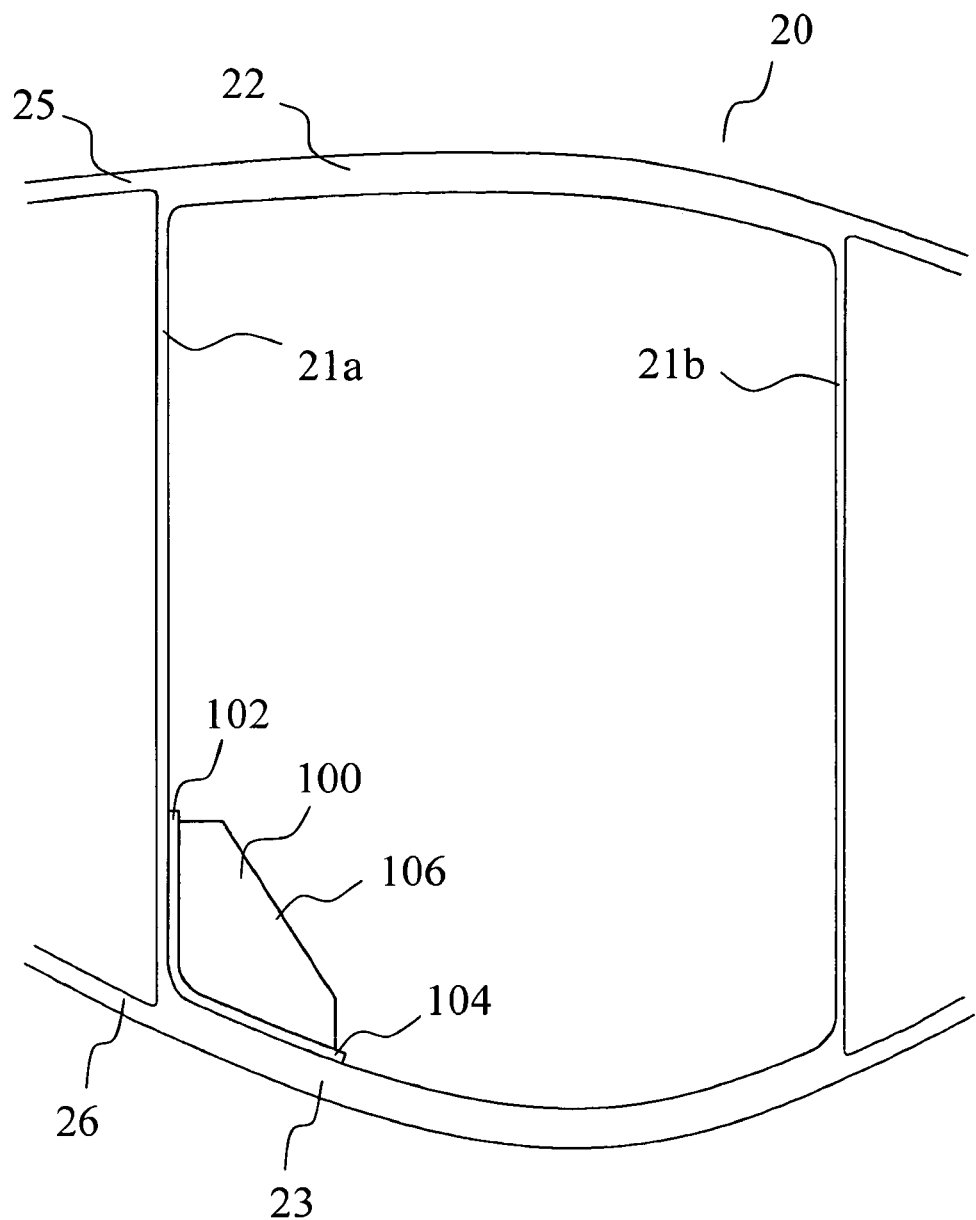
Figure 12:
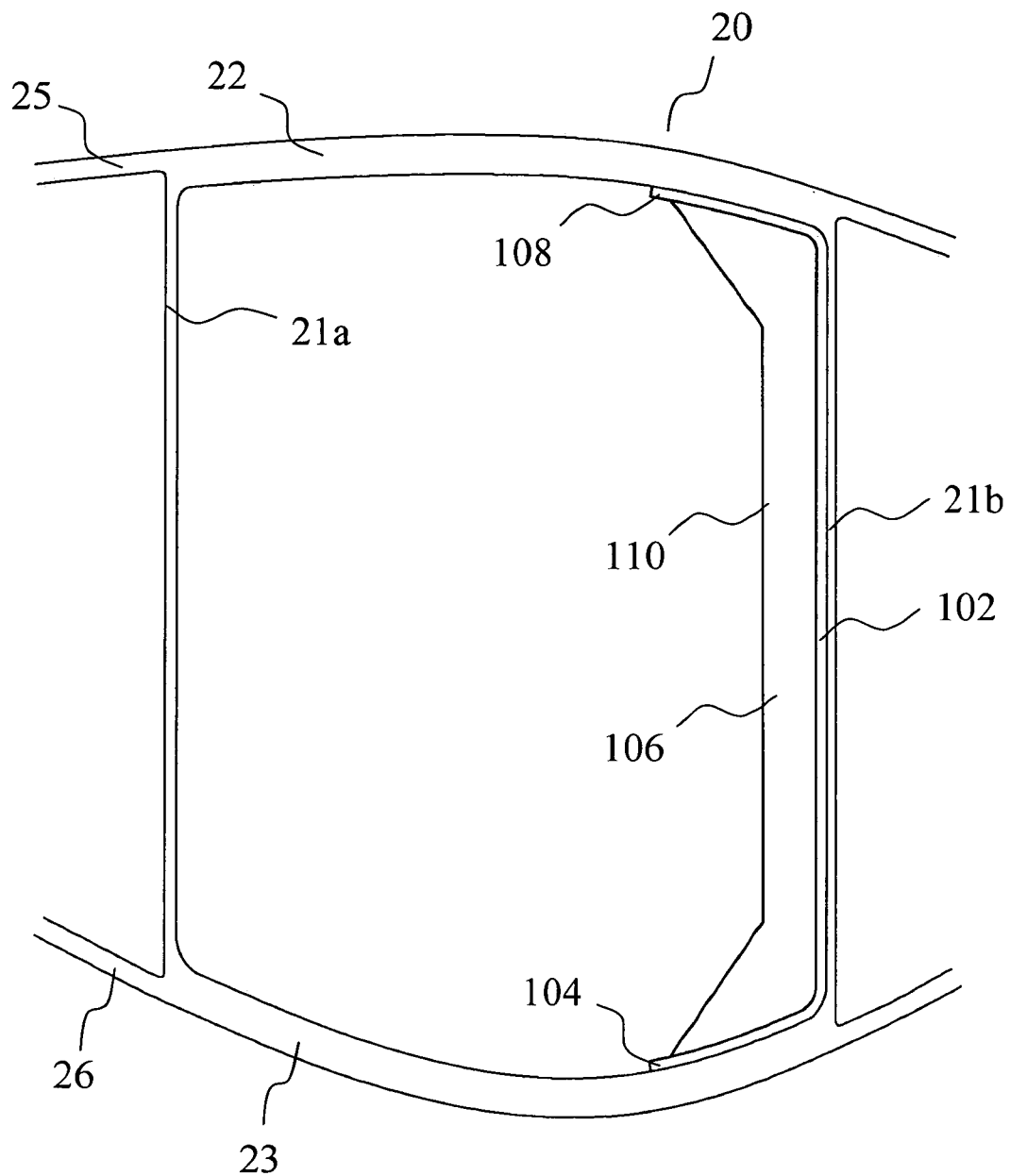
Figure 13:
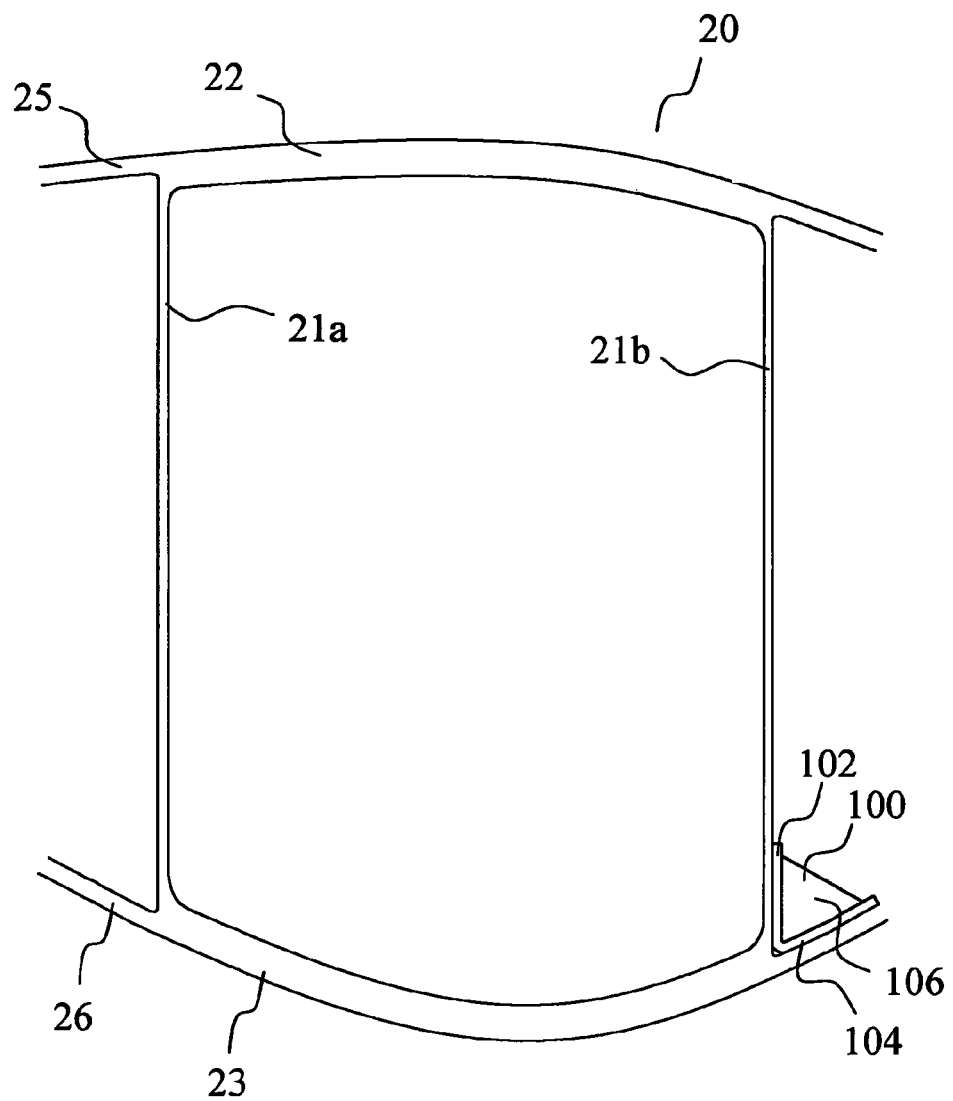
Figure 14:
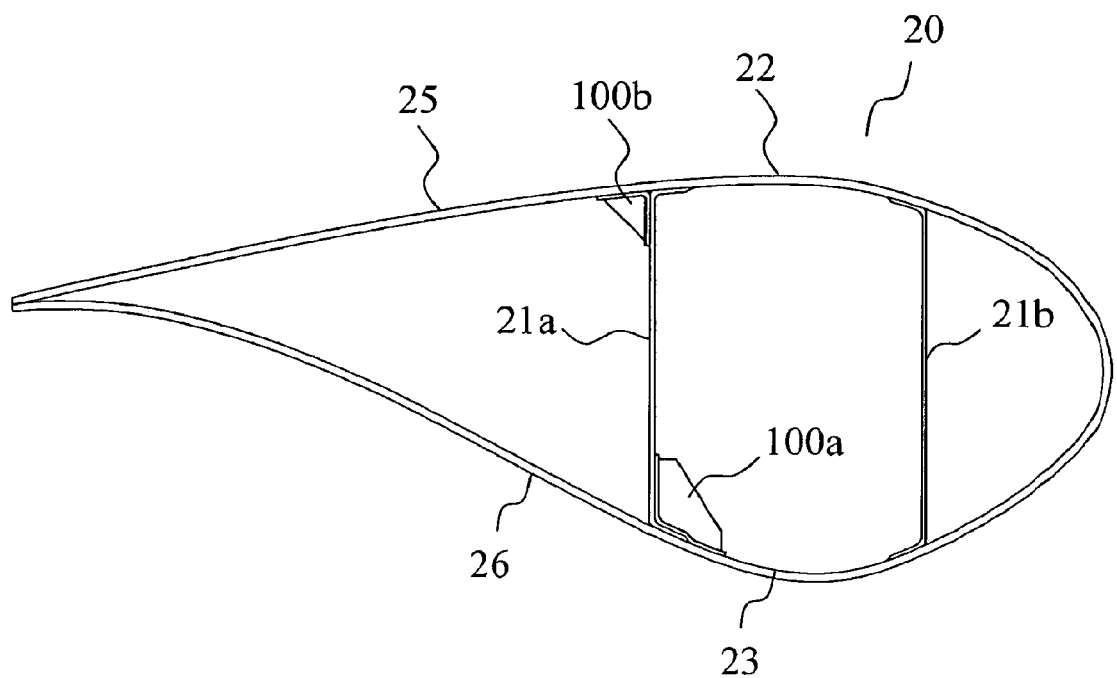
Figure 15:
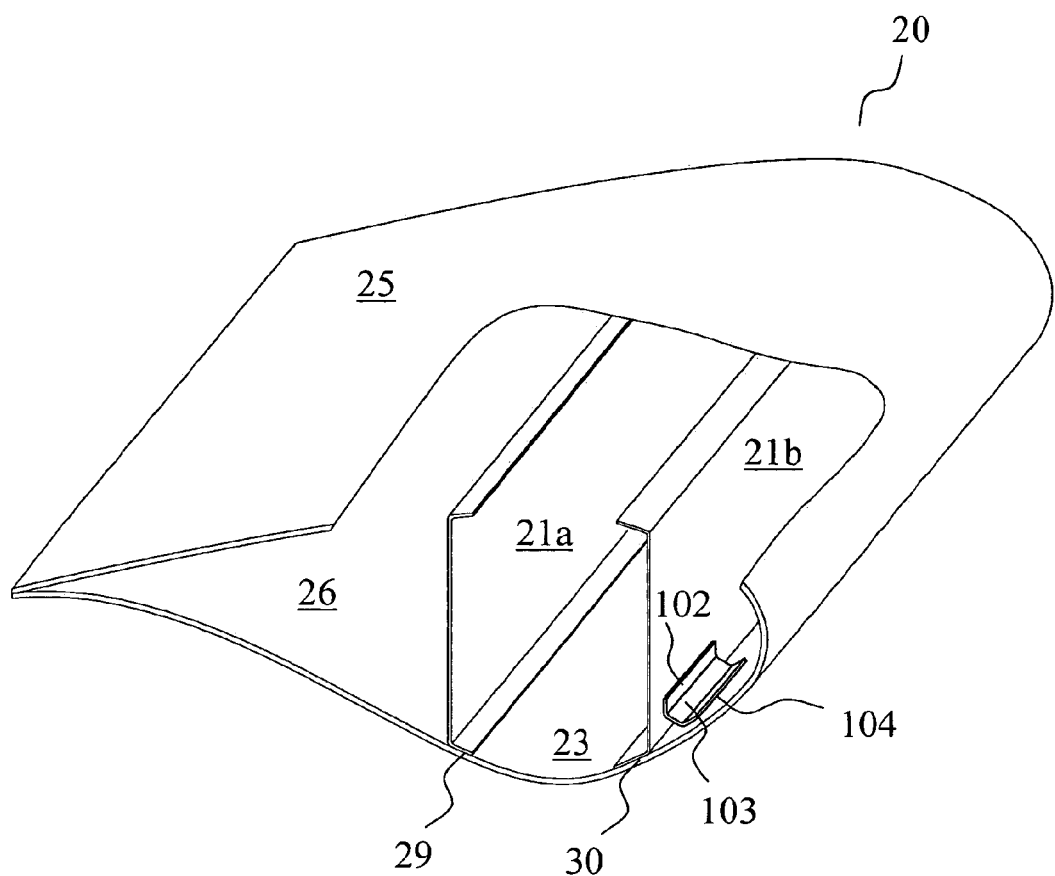
Figure 16:
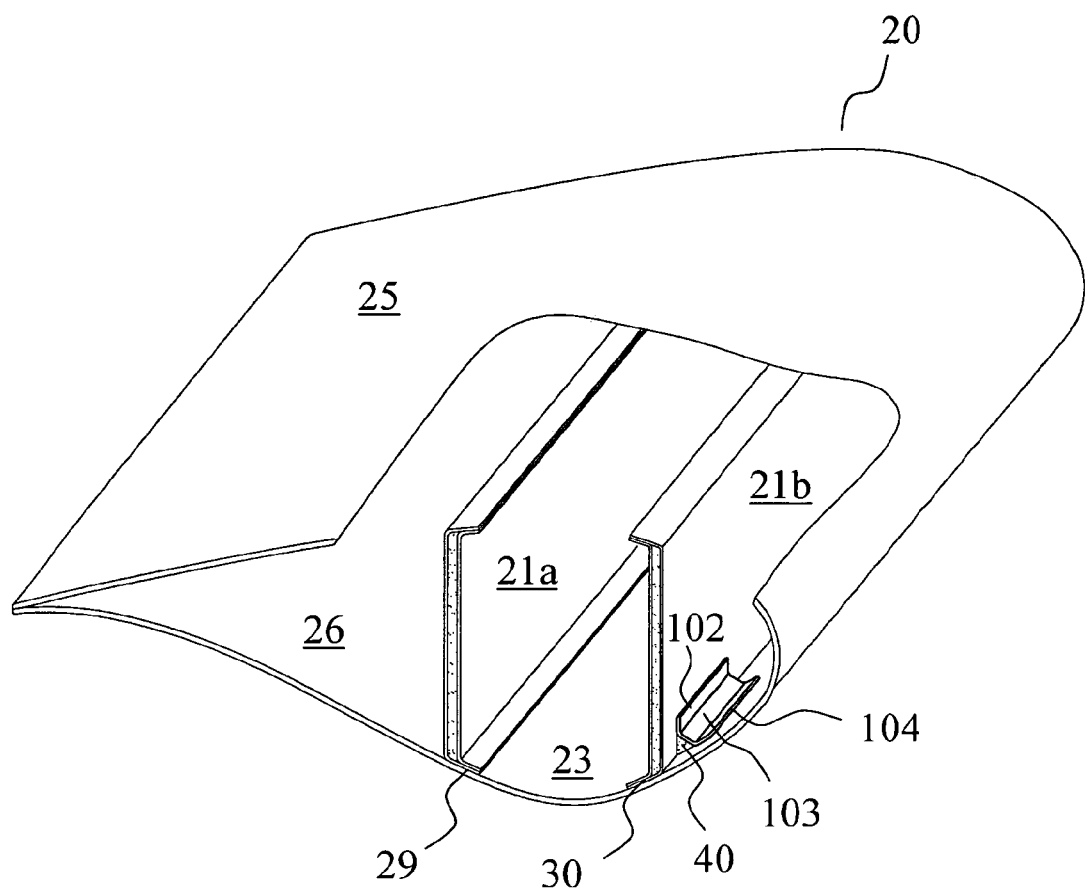
Figure 17:
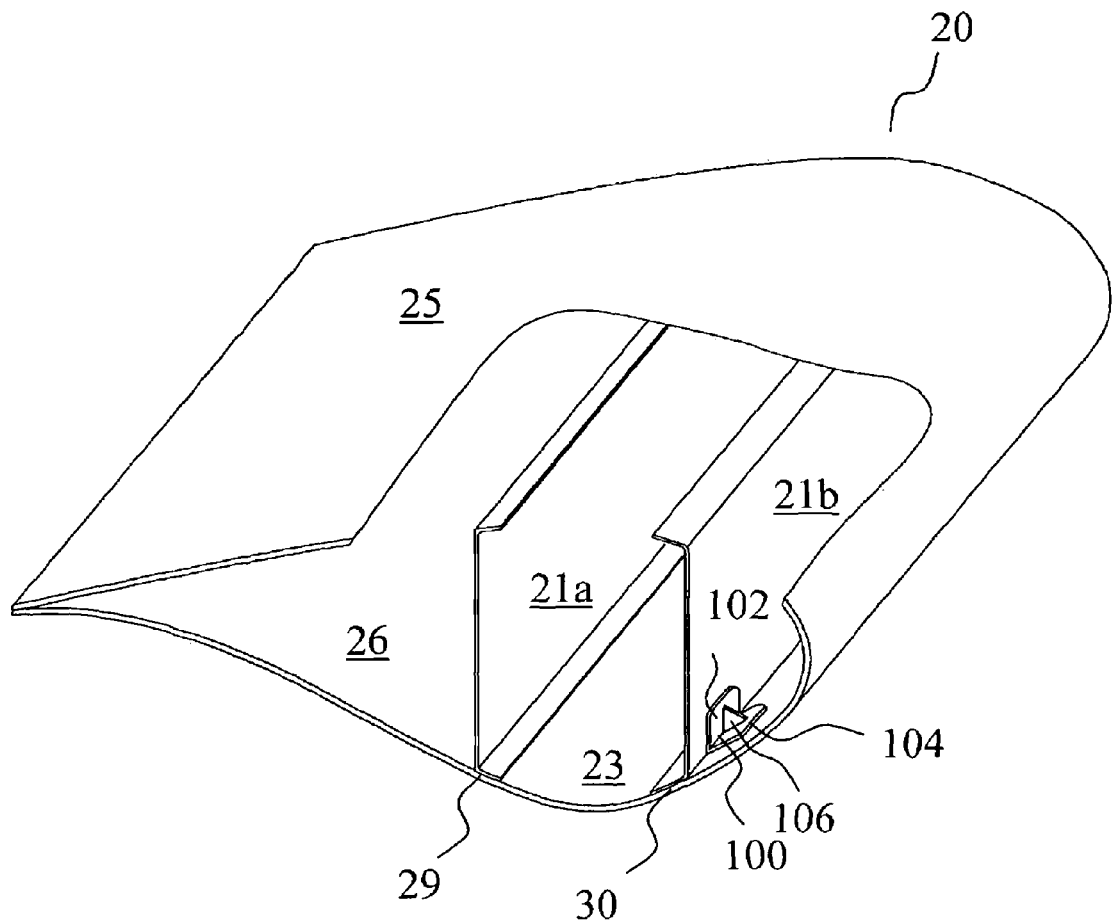
Figure 18:
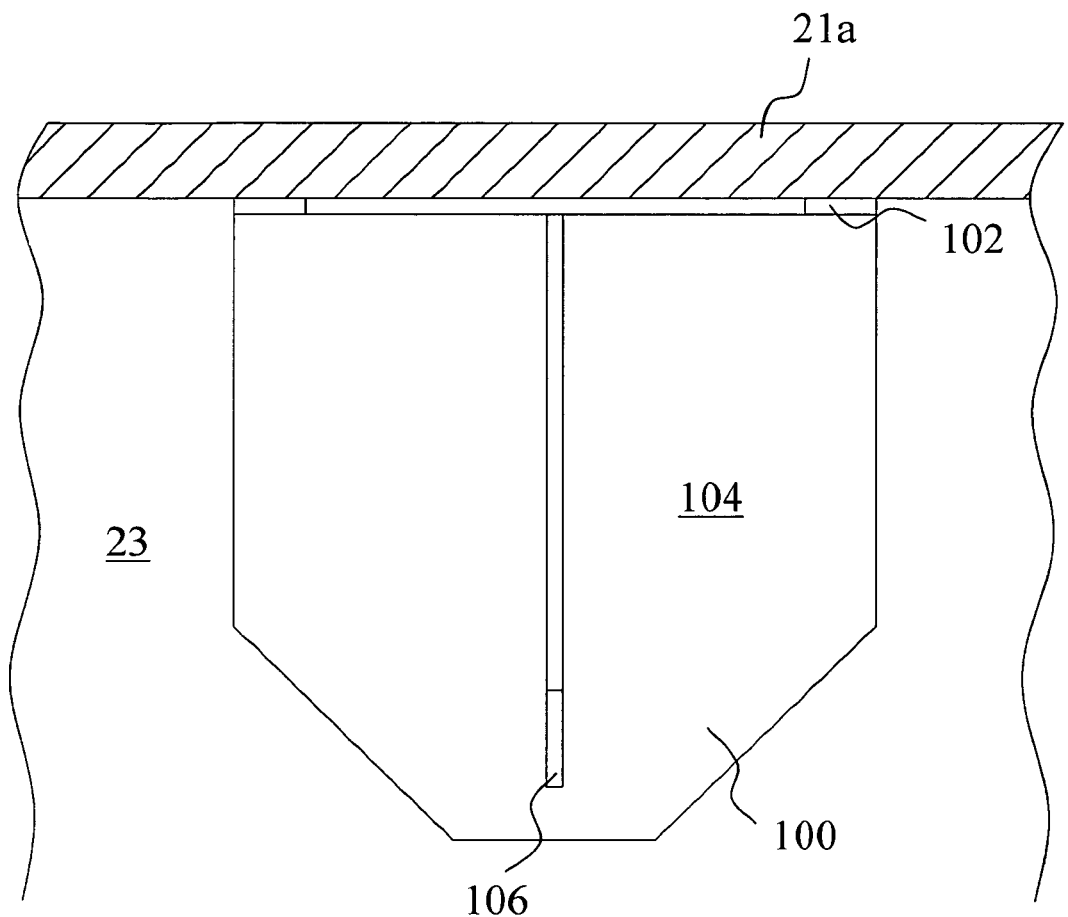
Figure 19:
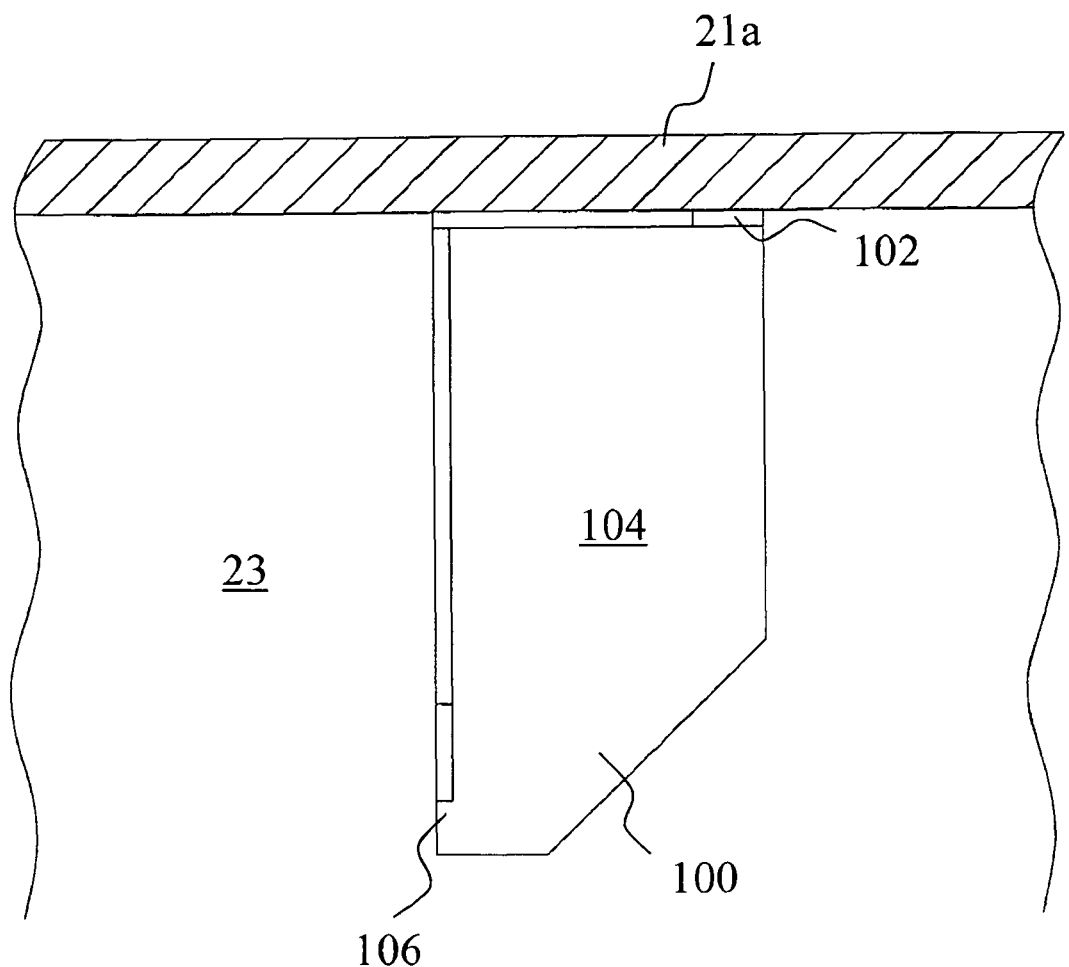
Figure 20:
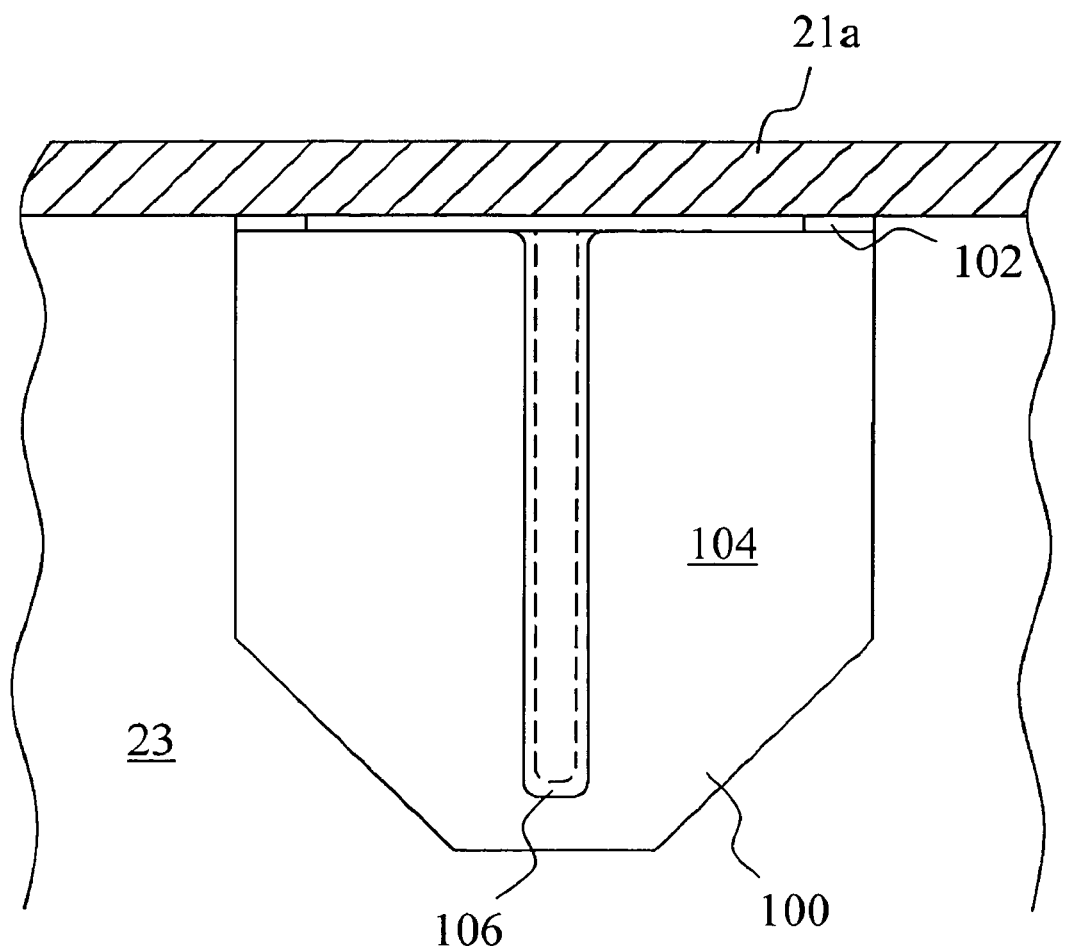
Figure 21:
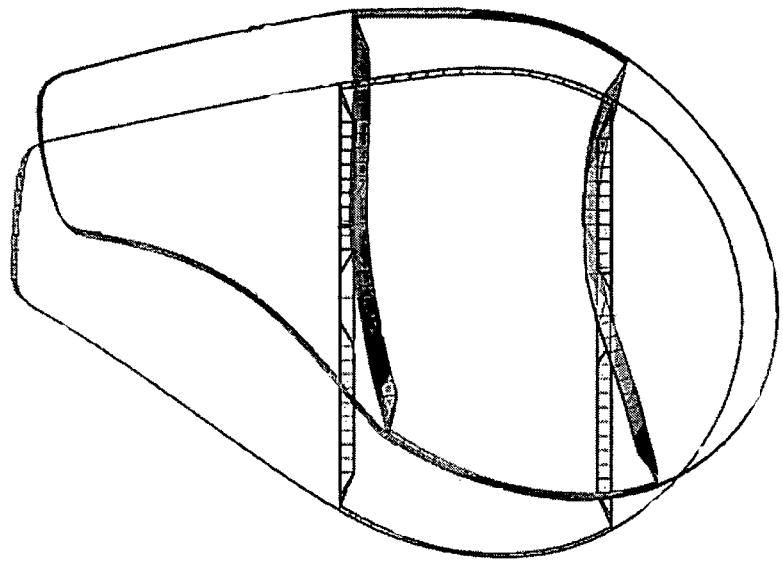
Figure 22:
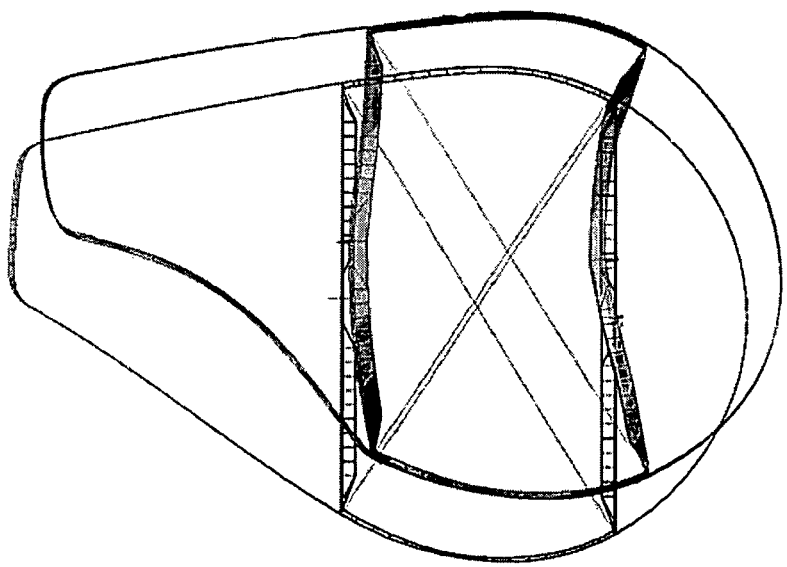

Below the invention will be described in more detail with reference to the exemplary embodiments illustrated in the drawings, wherein FIG. 1 schematically illustrates in perspective a wind turbine blade and arrows indicating the directions of flapwise, edgewise, and torsional loads, respectively, FIG. 2a is a schematic cross-section of a wind turbine blade with arrows indicating directions of transverse shear forces in the blade, FIG. 2b schematically illustrates deformation of a cross-section of a wind turbine blade caused by transverse shear forces, FIG. 3 is a schematic cross-section of a wind turbine blade with arrows indicating crushing pressure on the blade, FIG. 4 is a schematic cross-section of a wind turbine blade with an X-shaped reinforcing member interconnecting two girders and the upper and lower part of the shell, FIG. 5 is a schematic cross-section of a wind turbine blade with another X-shaped reinforcing member interconnecting two girders, FIG. 6 is a schematic cross-section of a wind turbine blade with yet another X-shaped reinforcing member interconnecting two girders and the upper and lower part of the shell, FIG. 7 is a schematic cross-section of a wind turbine blade with still another X-shaped reinforcing member interconnecting two girders and the upper and lower part of the shell, FIG. 8 is a schematic cross-section of a wind turbine blade with a straight reinforcing member, FIG. 9 schematically illustrates in perspective a wind turbine blade with part of the shell surface removed for making visible an internally positioned plurality of straight reinforcing members extending along crossing directions, FIG. 10 schematically illustrates in perspective a wind turbine blade with part of the shell surface removed for making visible internally positioned two girders connected by an X-shaped reinforcing member extending along the longitudinal extension of the blade, FIG. 11 is a schematic cross-section of a wind turbine blade with a reinforcing angle bar, FIG. 12 is a schematic cross-section of a wind turbine blade with another reinforcing angle bar, FIG. 13 is a schematic cross-section of a wind turbine blade with yet another reinforcing angle bar, FIG. 14 is a schematic cross-section of a wind turbine blade with a plurality of reinforcing angle bars, FIG. 15 schematically illustrates in perspective a wind turbine blade with an angle bar, FIG. 16 is a schematic cross-section of another wind turbine blade with the angle bar of FIG. 15, FIG. 17 schematically illustrates in perspective a wind turbine blade with still another angle bar, FIG. 18 is a schematic cross-section perpendicular to the girder showing a wind turbine blade with an angle bar, FIG. 19 is a schematic cross-section perpendicular to the girder showing another angle bar, FIG. 20 is a schematic cross-section perpendicular to the girder showing yet another angle bar, FIG. 21 shows the deformation of a conventional wind turbine blade at a sector near the root of the blade, and FIG. 22 shows the deformation of a wind turbine blade according to the invention at a sector near the root of the blade.

The figures are schematic and simplified for clarity, and they merely show details which are essential to the understanding of the invention, while other details have been left out. Throughout, the same reference numerals are used for identical or corresponding parts.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

FIG. 1 schematically illustrates in perspective a wind turbine blade 1 and arrows indicating the directions of flapwise F, edgewise E, and torsional T loads, respectively. The cross-section S1 is shown in FIGS. 2a+2b.

FIG. 2a is a schematic cross-section S1 of a wind turbine blade and arrows indicating directions C of transverse shear forces in the blade, FIG. 2b schematically illustrates deformation of a cross-section S1 of a wind turbine blade 1 caused by transverse shear forces. The illustrated blade 1 is twisted clockwise by the transverse shear forces.

FIG. 3 is a schematic cross-section of a wind turbine blade 1 having a shell 2 with leading edge 3 and trailing edge 4. The wind turbine blade 1 has a box profile with two girders 5 and caps 10 and 11 of the shell 2 located between the girders. The aerodynamic and inertia forces working on a blade in operation induce a bending moment on the blade and create a crushing pressure indicated by arrows B. The crushing pressure is also referred to as the Brazier effect (reference is made to the article "Structural testing and numerical simulation of a 34 m composite wind turbine blade" by F. M. Jensen et. al. published by Elsevier in Composite Structures 76 (2006) 52-61).

FIG. 4 is a schematic cross-section of a wind turbine blade 20 with an X-shaped reinforcing member 24 interconnecting two girders 21 and the upper thickened cap part 22 and the lower thickened cap part 23 of the shell. The two girders 21 and thickened cap parts 22 and 23 of the blade constitute a box profile. The box profile is reinforced with X-shaped reinforcing member 24. In the illustrated embodiment, the reinforcing member 24 is connected to both of the girders 21 and to the inner surfaces of both the upper and lower parts 25 and 26 of the shell of the blade. In the illustrated embodiment, the parts 21, 24, 25 and 26 are connected to each other with bonding connections 27-30, respectively. The X-shaped reinforcing member 24 comprises feet 31 each of which provides a large surface for bonding with the respective girder 21 and part 25, 26 of the shell. In the illustrated embodiment, the X-shaped reinforcing member 24 is made in one piece. Each leg of the X-shaped reinforcing member constitutes a straight reinforcing member. A foamed material 40 is located in the cavity between the member 24 and the inner surface of the cap 23. In the illustrated embodiment, the shape of the foamed material 40 matches the shape of the cavity whereby the material 40 may guide the positioning of the member 24 during assembly of the blade.

FIG. 5 is a front view of a box profile of a wind turbine blade 20 according to the invention. The box profile comprises two girders 21 and thickened caps 22 and 23 of the blade. In the illustrated embodiment, the blade has a box profile that is reinforced with two straight reinforcing members in the form of rods 24a and 24b. In FIG. 5, the rod 24a is positioned in front of the rod 24b. In the illustrated embodiment, the positions of the individual straight reinforcing members 24a, 24b may alternate along the longitudinal extension of the blade. In FIG. 5, the rod 24a connects the upper left corner 32 of the box profile with the lower right corner 33 of the box profile. The rod 24b connects the upper right corner 35 with the lower left corner 34 of the box profile. It should be noted that the rods 24a, 24b are not connected directly in the corners 32-35. In stead, the rods 24a, 25b are connected to the respective girders 21 proximate the inner surfaces of the respective shell parts 25 and 26. In the figure, the reinforcing members 24 connect both of the girders 21. In the illustrated embodiment, the reinforcing members 24 are mechanically connected to the girders 21 by leading rods 24a and 24b through suitable openings in the girders 21 and fastening them by means of a mechanical connection 36, such as a nut engaging with a threaded section of the end part of the rods 24a and 24b. The girders 21 further have retaining members 37 for guiding and supporting the connection 36.

FIG. 6 is a schematic cross-section of a wind turbine blade 20 with yet another X-shaped reinforcing member 24 interconnecting two girders 21 and the upper and lower caps 22, 23 of the shell. The two girders 21 and thickened cap parts 22 and 23 of the blade form a box profile. In the illustrated embodiment, the box profile is reinforced with an X-shaped reinforcing member 24 comprising two straight reinforcing members constituting the legs of the X-shaped member. Plate 24a constitutes one of the straight reinforcing members, and plates 24b, 24c constitute the other straight reinforcing member. Plate 24a connects the upper left corner 32 with the lower right corner 33 of the box profile. Plate 24b connects the upper right corner 35 with a first surface of plate 24a and is connected to the surface of plate 24a at connection 38. Plate 24c connects the lower left corner 34 of the box profile with a second side of plate 24a and is connected to the other surface of plate 24a at connection 39. The plates 24b and 24c are substantially aligned and co-operate to connect the opposite set of corners 34, 35 of the box profile. The X-shaped reinforcing member further comprises anchors 41 for connection with the respective corners 32-35. In the illustrated embodiment, the anchors 41 are bonded to the inner surface of the box profile. The plates 24a-c are received between two receiving surfaces 42 of the anchors and the plates 24a-c are bonded or adhered to the anchors 41. Similar anchors are provided at connections 38 and 39.

FIG. 7 is a schematic cross-section of a wind turbine blade 20 with still another X-shaped reinforcing member 24 interconnecting two girders 21 and the upper part 25 and the lower part 26 of the shell. The two girders 21 and thickened caps 22 and 23 of the blade constitute a box profile. In the illustrated embodiment, the X-shaped reinforcing member 24 is made of two angle plates 43a, 43b. Angle plates 43a and 43b have a generally triangular shape. Each of the angle plates 43a, 43b has feet 44 and a projection 45 facilitating connection of the angle plates 43a, 43b. In the illustrated embodiment, the feet 44 of angular plates 43a, 43b are bonded to flanges of the girders 21 and to inner surfaces of the shell parts 25 and 26 of the blade at the corners 32-35 of the box profile. The projections 45 of the angular plates are bonded to each other at the connection 46. Further a foamed material 40 is provided, e.g., in a cavity defined between angular plate 43a and the girder 21. The foamed material 40 has a shape that matches the shape of the cavity and is used for guiding positioning of the plate member 43a during assembly.

FIG. 8 is a schematic cross-section of a wind turbine blade 20 with a straight reinforcing member 47. The two girders 21 and thickened cap parts 22 and 23 of the blade constitute a box profile. The box profile is reinforced with a single straight reinforcing member 47 in the form of plate 47. Plate 47 is a sandwich construction with outer layers 48 of fibre reinforced plastic on both sides of a foamed material 49. The straight reinforcing member 47 has feet 50 providing connection surfaces for bonding the member 47 to the respective girder 21 and part 25, 26 of the shell. The feet 50 are bonded to respective flanges of the girders 21 as well as to inner surfaces of the respective shell parts 25 and 26 so that the straight reinforcing member 47 connects corners 34 and 35 of the box profile. The plate 47 may provide reinforcement against tension forces and compression forces.

FIG. 9 schematically illustrates in perspective a wind turbine blade 20 with part of the shell surface removed for making visible an internally positioned plurality of straight reinforcing members 51, 52 extending transversely along crossing directions. The blade 20 is reinforced with two straight reinforcing members 51, 52 similar to the straight reinforcing member 47 shown in FIG. 8, i.e. each of the reinforcing members 51, 52 is a plate, e.g., of a sandwich construction. In the illustrated embodiment, the straight reinforcing members 51, 52 are positioned at a mutual distance D (not indicated) along the longitudinal extension of the blade 20. It is seen that the first reinforcing member 51 extends between two diagonally opposed corners of the box profile and the second neighbouring reinforcing member 52 extends between the other two diagonally opposed corners of the box profile.

FIG. 10 schematically illustrates in perspective a wind turbine blade 20 with part of the shell surface removed for making visible internally positioned two girders 21 connected by an X-shaped reinforcing member 53 extending along the longitudinal extension of the blade 20. The blade 20 is reinforced with an X-shaped reinforcing member 53 connecting the corners of the box profile. The straight reinforcing member 53 is made in one piece and has feet 54 connected to flanges of the girders 21. The straight reinforcing member 53 and girders 21 are assembled before connection with the shell parts 25 and 26.

FIG. 11 is a schematic cross-section of a box profile of a wind turbine blade with a reinforcing angle bar 100 with a first leg 102 abutting the first girder 21a, and a second leg 104 abutting the lower cap 23 of the shell. The reinforcing angle bar 100 further comprises a plate 106 connected to the first leg 102 and the second leg 104 and protruding therefrom for further reinforcement of the blade 20. The plate 106 may for example extend centrally with relation to the first leg 102 and the second leg 104, or the plate may for example extend at a side edge of the first leg 102 and the second leg 104.

In the illustrated embodiment, the angle bar 100 is positioned at the connection between the girder 21a and the lower cap 23 of the shell between the girders 21a, 21b. The angle bar 100 reduces the change of the angle between the girder 21a and the shell 26 caused by transverse shear distortion of the blade 20. When the change of angle between the girder 21a and the shell 26 is reduced, the transverse distortion is also reduced.

The first leg 203 of the angle bar 100 abutting the girder 21a preferably constitutes a plate or flange with a surface contour that matches the contours of the girder 21a at the position of their interconnection. Likewise, the second leg 104 of the angle bar 100 abutting the cap 23 preferably constitutes a plate or flange with a surface contour that matches the contours of the cap 23 at the position of their interconnection. Preferably, the angle bar 100 with the plate is manufactured in one piece.

The reinforcing member may be subjected to tensile and compressive forces when the blade is loaded. To prevent the reinforcing member from buckling when subjected to compression forces, the member can be stiffened with flanges on top of the member or stringers on the side. Further, the member may constitute a sandwich construction with a foam material with laminates on each side.

FIG. 12 is a schematic cross-section of a box profile of a wind turbine blade 20 with another reinforcing angle bar 110 with a first leg 102 abutting the second girder 21b, and a second leg 104 abutting the lower cap 23 of the shell. The reinforcing angle bar 110 further comprises a third leg 108 connected to the first leg 102 opposite the second leg 104 and abutting the upper cap 22 of the shell. The reinforcing angle bar 100 also comprises a plate 106 connected to the first leg 102, the second leg 104, and the third leg 106, and protruding therefrom for further reinforcement of the blade 20. The plate 106 may for example extend centrally with relation to the first leg 102, the second leg 104, and the third leg 106, or the plate may for example extend at a side edge of the first leg 102, the second leg 104, and the third leg 106. In the illustrated embodiment, the angle bar 100 is positioned between the girders 21a, 21b. The angle bar 100 reduces the change of the angle between the girder 21b and the lower cap 23 and of the angle between the girder 21b and the upper cap 22 caused by transverse shear distortion of the blade 20. When the change of the angles between the girder 21a and the upper cap 22 and the lower cap 23 is reduced, the transverse distortion is also reduced. Similar to the angle bar 100 shown in FIG. 12, the surfaces of the angle bar 110 match corresponding surfaces of the box profile.

FIG. 13 is a schematic cross-section of a box profile of wind turbine blade with yet another reinforcing angle bar 100 somewhat similar to the angle bar 100 shown in FIG. 11. The angle bar 100 illustrated in FIG. 13 has a first leg 102 abutting the second girder 21b, and a second leg 104 abutting the lower cap 23 of the shell. The reinforcing angle bar 100 further comprises a plate 106 connected to the first leg 102 and the second leg 104 and protruding therefrom for further reinforcement of the blade 20. The plate 106 may for example extend centrally with relation to the first leg 102 and the second leg 104, or the plate may for example extend at a side edge of the first leg 102 and the second leg 104.

In the illustrated embodiment, the angle bar 100 is positioned outside the internal volume defined by the box profile. The angle bar 100 reduces the change of the angle between the girder 21b and the shell 26 caused by transverse shear distortion of the blade 20. When the change of angle between the girder 21b and the shell 26 is reduced, the transverse distortion is also reduced.

FIG. 14 is a schematic cross-section of a wind turbine blade 20 with a plurality of reinforcing angle bars 100a, 100b similar to the angle bars shown in FIGS. 11 and 13.

FIG. 15 schematically illustrates in perspective a wind turbine blade 20 with a reinforcing angle bar 100 with a first leg 102 abutting the second girder 21b, and a second leg 104 abutting the lower part 26 of the shell. The reinforcing angle bar 100 further comprises a body plate 103 interconnecting the first leg 102 and the second leg 104. Thus, the first leg 102 and the second leg 104 are interconnected with the girder 21b and the shell 26, respectively, at some distance from the connection 30 between the girder 21b and the lower part 26 of the shell. The reinforcing angle bar 100 with the body plate 103 extends in the longitudinal direction of the blade 20.

As shown in FIG. 16, in its operating position in the blade 20, the body plate 103 may be supported by foam 40 located in the volume defined between the girder 21b, the lower part 26 of the shell, and the body plate 103 to prevent buckling failure when loaded in compression. The body plate may be a sandwich construction or may have corrugations or stiffeners to prevent buckling failure. In FIG. 16, the girders 21a, 21b are sandwich constructions.

FIG. 17 is similar to FIG. 16 with the difference that the reinforcing angle bar with a body plate 103 has been substituted with the angle bar shown in FIG. 13. The centre positioning of the plate 106 with relation to the first leg 102 and the second leg 104 is clearly visible.

FIG. 18 is a schematic cross-section perpendicular to the girder showing a wind turbine blade 20 with the reinforcing angle bar 100 shown in FIG. 1.

FIG. 19 is a schematic cross-section perpendicular to the girder showing a wind turbine blade 20 with another angle bar in which the plate 106 is positioned along a side of the first leg 102 and a side of the second leg 104.

FIG. 20 is a schematic cross-section perpendicular to the girder showing a wind turbine blade 20 with a reinforcing angle bar corresponding to the reinforcing angle bar of FIG. 19 however with a plate 106 that is a sandwich construction.

An embodiment of the invention was analysed with respect to increased strength as compared to a conventional wind turbine blade using numerical modelling of a 34 m wind turbine blade designed for use on a 1.5 MW wind turbine.

The numerical analysis included Finite Element analysis of a model containing more than 150 000 shell and 3D elements. Advanced software and algorithms were used in the analysis to account for the effect of nonlinear geometrical deformations.

The model of the blade has been verified with full-scale test of the blade ("Structural testing and numerical simulation of a 34 m composite wind turbine blade" by F. M. Jensen et. al. published by Elsevier in Composite Structures 76 (2006) 52-61). The blade was loaded with a combination of loads in both flapwise and edgewise direction that should simulate the operational loads of the blade.

The analysis showed a significant reduction of transverse shear distortion when the blade is equipped with the invention. FIGS. 21 and 22 show the results of the analysis of a sector near the root of the blade.

The analysis shows a reduction of the transverse shear distortion of the profile and this increase the blade's resistance to the crushing pressure and thereby increases the ultimate strength of the wind turbine blade.

Furthermore, the aerodynamic efficiency of the blade is also improved since the designed shape of the blade profile is maintained to a higher degree than for a conventional blade.

The scope of the present invention is set out by the accompanying claim set. In the context of the claims, the terms "comprising" or "comprises" do not exclude other possible members or steps. Also, the mentioning of references, such as "a", "an", etc., should not be construed as excluding a plurality. Furthermore, individual features mentioned in different claims, may possibly be advantageously combined, and the mentioning of these features in different claims does not exclude that a combination of features is not possible and advantageous.

The invention claimed is:

1. A horizontal-axis wind turbine blade, comprising:
a shell having an upper part and a lower part, the upper part including an upper convex section and the lower part including a lower convex section;
a first girder connected between the upper convex section and the lower convex section; and
a first straight reinforcing member for inhibiting transverse shear distortion of the blade, wherein the first straight reinforcing member is connected to the first girder proximate to a connection between the first girder and the shell at one of the upper part and lower part of the shell, and connected to the other one of the upper part and lower part of the shell at a distance from the first girder.

2. A horizontal-axis wind turbine blade according to claim 1, further comprising a second girder spaced from the first girder along the shell, the second girder being connected between the upper convex section and the lower convex section, wherein the first straight reinforcing member interconnects the first and second girders proximate to a connection between the first girder and the shell at one of the upper part and lower part of the shell and a connection between the second girder and the shell at the other one of the upper part and lower part of the shell.

3. A horizontal-axis wind turbine blade according to claim 1, wherein the first straight reinforcing member includes at least one element selected from the group consisting of a plate, a rod, a wire, a rope, a tube, a textile, and a fabric.

4. A horizontal-axis wind turbine blade according to claim 1, comprising a plurality of first straight reinforcing members positioned in spaced relationship along the longitudinal extension of the blade with a mutual distance that is less than 2×D, wherein D is the distance of opposing connections of one of the plurality of straight reinforcing members to the upper part and lower part of the shell, respectively.

5. A horizontal-axis wind turbine blade according to claim 1, wherein the first straight reinforcing member comprises a laminated plate.

6. A horizontal-axis wind turbine blade according to claim 5, wherein the laminated plate is a sandwich construction.

7. A horizontal-axis wind turbine blade according to claim 1, wherein at least one reinforcing member comprises an electro-mechanical transducer.

8. A horizontal-axis wind turbine blade according to claim 7, wherein the electro-mechanical transducer is a piezoelectric transducer.

9. A horizontal-axis wind turbine blade according to claim 1, wherein the upper and lower convex sections substantially overlap.

10. A horizontal-axis wind turbine blade according to claim 1, wherein the upper and lower convex sections oppose one another and define a widest cross section of the shell.

11. A horizontal-axis wind turbine blade according to claim 1, wherein the upper convex section and the lower convex section are thicker than remaining sections of the shell.

12. A horizontal-axis wind turbine blade according to claim 1, wherein the first straight reinforcing member is connected to the first girder at the connection between the first girder and the shell at one of the upper part and lower part of the shell.

13. A horizontal-axis wind turbine blade according to claim 2, further comprising a second straight reinforcing member interconnecting the first and second girders proximate to a connection between the first girder and the shell at the one of the upper part and lower part of the shell that is opposite the connection of the first straight reinforcing member to the first girder and a connection between the second girder and the shell at the other one of the upper part and lower part of the shell whereby the first and second straight reinforcing members form a cross in a transverse cross-section of the blade.

14. A horizontal-axis wind turbine blade according to claim 13, wherein the first and second straight reinforcing members form an X-shaped reinforcing member interconnecting the upper part of the shell with the lower part of the shell at the respective connection points of the first and second girders to the upper and lower parts of the shell.

15. A horizontal-axis wind turbine blade according to claim 14, wherein the X-shaped reinforcing member is made in one piece.

16. A horizontal-axis wind turbine blade according to claim 15, wherein the X-shaped reinforcing member and the first and second girders are provided as a single integrated member.

17. A horizontal-axis wind turbine blade according to claim 13, wherein the first and second girders form a box profile and the straight reinforcing member connects two diagonally opposite corner regions of the box profile.

18. A horizontal-axis wind turbine blade according to claim 13, wherein the second straight reinforcing member comprises at least one element selected from the group consisting of a plate, a rod, a wire, a rope, a tube, a textile and a fabric.

19. A horizontal-axis wind turbine blade according to claim 13, comprising the first and second straight reinforcing members are part of a plurality of the straight reinforcing members positioned in a spaced relationship along the longitudinal extension of the blade with a mutual distance that is less than 2×D, wherein D is the distance of opposing connections of one of the plurality of straight reinforcing members to the upper part and lower part of the shell, respectively.

20. A wind turbine blade comprising:
a shell;
a first girder; and
a reinforcing member for inhibiting transverse shear distortion of the blade, wherein the reinforcing member is connected to the first girder at a connection between the first girder and the shell at one of the upper part and lower part of the shell,
wherein the reinforcing member is a reinforcing angle bar with a first leg abutting the first girder, a second leg abutting the one of the upper part and lower part of the shell, and a plate connected to the first and second legs and protruding therefrom.

21. A wind turbine blade according to claim 20, wherein the plate extends centrally with relation to the first and second legs.

22. A wind turbine blade according to claim 20, wherein the plate extends at side edges of the first and second legs.

23. A wind turbine blade according to claim 20, wherein the reinforcing angle bar further comprises a body plate interconnecting its first and second legs.

24. A wind turbine blade according to claim 20, further comprising a third leg, the third leg abutting the one of the upper part and lower part of the shell opposite the second leg.

25. A method of inhibiting transverse shear distortion in a horizontal-axis wind turbine blade with a shell and a first girder, wherein the shell includes an upper part having an upper convex section and a lower part having lower convex section, the first girder being connected between the upper convex section and the lower convex section, the method comprising:

providing a straight reinforcing member with a first end and a second opposite end;

connecting the first end to the first girder at the connection between the first girder and the shell at the upper convex section or the lower convex section of the shell; and connecting the second end to the opposite part of the shell at a distance from the girder.

* * * * *